US012767739B2

(12) United States Patent
Konaganti et al.

(10) Patent No.: US 12,767,739 B2
(45) Date of Patent: Oct. 20, 2026

(54) ETHYLENE INTERPOLYMER PRODUCT AND FILMS THEREOF

(71) Applicant: NOVA CHEMICALS (INTERNATIONAL) S.A., Fribourg (CH)

(72) Inventors: Vinod Konaganti, Calgary (CA); Soheil Sadeghi, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 968 days.

(21) Appl. No.: 17/923,087

(22) PCT Filed: May 3, 2021

(86) PCT No.: PCT/IB2021/053686
§ 371 (c)(1),
(2) Date: Nov. 3, 2022

(87) PCT Pub. No.: WO2021/229358
PCT Pub. Date: Nov. 18, 2021

(65) Prior Publication Data

US 2023/0151130 A1 May 18, 2023

Related U.S. Application Data

(60) Provisional application No. 63/024,064, filed on May 13, 2020.

(51) Int. Cl.

| | |
|---|---|
| ***C08F 210/02*** | (2006.01) |
| ***B29C 48/00*** | (2019.01) |
| ***B29C 48/08*** | (2019.01) |
| ***C08F 2/06*** | (2006.01) |
| ***C08F 4/659*** | (2006.01) |
| ***C08F 4/6592*** | (2006.01) |
| ***C08F 210/14*** | (2006.01) |
| ***C08L 23/0807*** | (2025.01) |
| *B29K 23/00* | (2006.01) |
| *B29L 7/00* | (2006.01) |

(52) U.S. Cl.
CPC ........ *C08F 210/02* (2013.01); *B29C 48/0017* (2019.02); *B29C 48/022* (2019.02); *B29C 48/08* (2019.02); *C08F 2/06* (2013.01); *C08F 4/65912* (2013.01); *C08F 4/6592* (2013.01); *C08F 210/14* (2013.01); *C08L 23/0815* (2013.01); *B29K 2023/08* (2013.01); *B29L 2007/00* (2013.01); *C08F 2800/10* (2013.01); *C08L 2203/16* (2013.01); *C08L 2205/025* (2013.01); *C08L 2314/02* (2013.01); *C08L 2314/06* (2013.01)

(58) Field of Classification Search
CPC ...... C08F 210/02; C08F 2/06; C08F 4/65912; C08F 4/6592; C08F 210/14; C08F 2800/10; C08F 210/16; B29C 48/0017; B29C 48/022; B29C 48/08; C08L 23/0815; C08L 2203/16; C08L 2205/025; C08L 2314/02; C08L 2314/06; B29K 2023/08; B29L 2007/00; B32B 7/12; B32B 27/306; B32B 27/34; B32B 27/36; B32B 2250/03; B32B 2250/05; B32B 2250/24; B32B 2250/242; B32B 2255/10; B32B 2255/20; B32B 27/08; B32B 2270/00; B32B 2307/31; B32B 2307/406; B32B 2307/412; B32B 2307/558; B32B 2307/7244; B32B 2307/7246; B32B 2307/7248; B32B 2439/06; B32B 2439/46; B32B 2439/70; B32B 27/32; B32B 27/327; C08J 2323/08; C08J 2423/08; C08J 5/18
See application file for complete search history.

(56) References Cited

U.S. PATENT DOCUMENTS 9,512,282 B2 12/2016 Li et al.
2016/0108185 A1 4/2016 Wang et al.
(Continued)

FOREIGN PATENT DOCUMENTS

CA 2868640 A1 4/2016
WO WO-93/03093 A1 2/1993
WO WO-00/17244 A1 3/2000

OTHER PUBLICATIONS

ASTM D1003-13, Standard Test Method for Haze and Luminous Transmittance of Transparent Plastics, Nov. 15, 2013, 7 pages.
ASTM D1238-13, Standard Test Method for Melt Flow Rates of Thermoplastics by Extrusion Plastometer, Aug. 1, 2013, 16 pages.
ASTM D1709A-16a, Standard Test Methods for Impact Resistance of Plastic Film by the Free-Falling Dart Method, May 1, 2016, 10 pages.
ASTM D1922-09, Standard Test Method for Propagation Tear Resistance of Plastic Film and Thin Sheeting by Pendulum Method, May 1, 2009, 7 pages.
(Continued)

*Primary Examiner* — Kumar R Bhushan
(74) *Attorney, Agent, or Firm* — Thomas J. Styslinger

(57) ABSTRACT

An ethylene interpolymer product comprises from 40 to 80 weight % of a first ethylene interpolymer having a molecular weight distribution index of Formula (I), and, from 20 to 60 weight % of a second ethylene interpolymer having a molecular weight distribution index of Formula (II), wherein said ethylene interpolymer product is characterized by a dilution Index, $Y_d$, greater than 0, and, a solid-to-liquid transition temperature not greater than 112° C. The ethylene interpolymer product may be further characterized as having a weighted Rheological Adhesion Parameter, $Rh_{adh}$, greater than 1.5. Films made from the ethylene interpolymer product composition have a hot tack seal onset temperature less than 90° C. and a hot tack window at 2.5N measured on a 2 mil blown film no less than 30° C.

34 Claims, 11 Drawing Sheets

(56) References Cited

U.S. PATENT DOCUMENTS

2018/0230298 A1 8/2018 Wang et al.
2021/0102050 A1* 4/2021 Bellehumeur .......... B29C 41/04

OTHER PUBLICATIONS

ASTM D2457-13, Standard Test Method for Specular Gloss of Plastic Films and Solid Plastics, Apr. 1, 2013, 6 pages.
ASTM D2582-09, Standard Test Method for Puncture-Propagation Tear Resistance of Plastic Film and Thin Sheeting, May 1, 2009, 5 pages.
ASTM D5748-95, Standard Test Method for Protrusion Puncture Resistance of Stretch Wrap Film, Apr. 1, 2012, 4 pages.
ASTM D6474-99, Standard Test Method for Determining Molecular Weight Distribution and Molecular Weight Averages of Polyolefins by High Temperature Gel Permeation Chromatography, Mar. 15, 2006, 6 pages.
ASTM D792-13, Standard Test Methods for Density and Specific Gravity (Relative Density) of Plastics by Displacement, Nov. 1, 2013, 6 pages.
ASTM D882-12, Standard Test Method for Tensile Properties of Thin Plastic Sheeting, Aug. 1, 2012, 11 pages.
Doerpinghaus, P. J. et al., Separating the Effects of Sparse Long-Chain Branching on Rheology From Those Due to Molecular Weight in Polyethylenes, J. Rheol. 47, 717-736 (Abstract only), 10 pages (2003).
Gelfer, M. et al., Physical Gelation of Crystallizing Metallocene and Ziegler-Natta Ethylene-Hexene Copolymers, Polymer 44, pp. 2363-2371 (2003).
Graessley, W., Effect of Long Branches on the Flow Properties of Polymers, Accounts of Chemical Research, pp. 332-339 (1977).
International Search Report and Written Opinion mailed Jul. 10, 2021 in corresponding international application PCT/IB2021/053686, 8 pages.
Randall, J.C., A Review of High Resolution Liquid 13-Carbon Nuclear Magnetic Resonance Characterizations of Ethylene-Based Polymers, Rev. Macromol. Chem. Phys., 29, pp. 201-202 and 285-286 (1989).
Wild, L. et al. Determination of Branching Distributions in Polyethylene and Ethylene Copolymers, J Polymer Science: Polymer Physics Edition, vol. 20, pp. 441-455 (1982).
Winter, H. H., The Critical Gel, The Universal Material State between Liquid and Solid, Structure and Dynamics of Polymer and Colloidal Systems, Springer, Dordrecht, pp. 439-470 (2002).
Yau, W. et al., Application of Triple-Detector Size Exclusion Chromatography (On-Line Differential Refractometer, Viscometer and Light Scattering Detectors) for the Characterization of Brominated Polystyrene, Int'l J Polymer Analysis and Characterization, vol. 2, pp. 151-171 (1996).

* cited by examiner

ETHYLENE INTERPOLYMER PRODUCT AND FILMS THEREOF

CROSS-REFERENCE TO RELATED APPLICATIONS

This application is a U.S. National Phase Application under 35 U.S.C. § 371 of International Application No. PCT/IB2021/0053686, filed May 3, 2021, which claims priority to and the benefit of U.S. Provisional Application No. 63/024,064, filed May 13, 2020, both of which are hereby incorporated by reference in their entireties.

TECHNICAL FIELD

The present disclosure provides ethylene interpolymer products having a solid-to-liquid transition temperature not greater than 112° C. The ethylene interpolymer products comprise one polyethylene component which is made with a single site polymerization catalyst and one polyethylene component which is made with multi-site polymerization catalyst.

BACKGROUND ART

Multicomponent polyethylene compositions are well known in the art. One method to access multicomponent polyethylene compositions is to use two or more distinct polymerization catalysts in one or more polymerization reactors. For example, the use of single site and Ziegler-Natta type polymerization catalysts in at least two distinct solution polymerization reactors is known. Such reactors may be configured in series or in parallel.

Regardless of the manner of production, there remains a need to improve the performance of multicomponent polyethylene compositions in flexible film applications such as heat-sealing properties. Non-limiting heat-sealing performance attributes are heat seal initiation temperature, breadth of heat-sealing window, etc.

SUMMARY OF INVENTION

Provided herein are ethylene interpolymer products which when made into film have a good heat-sealing performance, good slow puncture and dart impact properties. The obtained films further have good optical properties and a good balance of film toughness and stiffness.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 1.5.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 2.5.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 3, a solid-to-liquid transition temperature not greater than 112° C.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C.; wherein the weight average molecular weight of the second ethylene interpolymer $$(M_w^2)$$

and the weight average molecular weight of the first ethylene interpolymer $$(M_w^1)$$

satisfy $$1 \le \frac{M_w^2}{M_w^1} \le 2$$

inequality.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C.; wherein the weight average molecular weight of the second ethylene interpolymer $$(M_w^2)$$

and the weight average molecular weight of the first ethylene interpolymer $$(M_w^1)$$

satisfy $$1 \le \frac{M_w^2}{M_w^1} \le 2$$

inequality; and the number of short chain branches per thousand carbon atoms in the second ethylene interpolymer ($SCB^2$) and the number of short chain branches per thousand carbon atoms in the first ethylene interpolymer ($SCB^1$) satisfy $$0.7 < \frac{SCB^2}{SCB^1} < 1.1$$

inequality.

An embodiment of the disclosure is an ethylene interpolymer product comprising: from 40 to 80 weight % of a first ethylene interpolymer having a molecular weight distribution index of $$\frac{M_w}{M_n} < 2.3,$$

a solid-to-liquid transition temperature not greater than 112° C., a weighted Rheological Adhesion Parameter, $\mathcal{R}h_{adh}$ from 0.5 to 1.5; and from 20 to 60 weight % of a second ethylene interpolymer having a molecular weight distribution index of $$\frac{M_w}{M_n} > 2.3,$$

a solid-to-liquid transition temperature greater than 112° C., a weighted Rheological Adhesion Parameter, $\mathcal{R}h_{adh}$ from 1.5 to 2.5; wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 1.5.

An embodiment of the disclosure is an ethylene interpolymer product comprising: from 40 to 80 weight % of a first ethylene interpolymer having a molecular weight distribution index of $$\frac{M_w}{M_n} < 2.3,$$

a solid-to-liquid transition temperature not greater than 112° C., a weighted Rheological Adhesion Parameter, $\mathcal{R}h_{adh}$ from 0.5 to 1.5; and from 20 to 60 weight % of a second ethylene interpolymer having a molecular weight distribution index of $$\frac{M_w}{M_n} > 2.3,$$

a solid-to-liquid transition temperature greater than 112° C., a weighted Rheological Adhesion Parameter, $\mathcal{R}h_{adh}$ from 1.5 to 2.5; wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{ash}$, greater than 2.5.

An embodiment of the disclosure is an ethylene interpolymer product consisting of:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.

An embodiment of the disclosure is an ethylene interpolymer product consisting of:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 1.5.

An embodiment of the disclosure is an ethylene interpolymer product consisting of:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 2.5.

An embodiment of the disclosure is an ethylene interpolymer product consisting of:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 3, a solid-to-liquid transition temperature not greater than 112° C.

An embodiment of the disclosure is an ethylene interpolymer product consisting of:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C.; wherein the weight average molecular weight of the second ethylene interpolymer $$(M_w^2)$$

and the weight average molecular weight of the first ethylene interpolymer $$(M_w^1)$$

satisfy $$1 \le \frac{M_w^2}{M_w^1} \le 2$$

inequality.

An embodiment of the disclosure is an ethylene interpolymer product consisting of:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C.; wherein the weight average molecular weight of the second ethylene interpolymer $$(M_w^2)$$

and the weight average molecular weight of the first ethylene interpolymer $$(M_w^1)$$

satisfy $$1 \le \frac{M_w^2}{M_w^1} \le 2$$

inequality; and the number of short chain branches per thousand carbon atoms in the second ethylene interpolymer ($SCB^2$) and the number of short chain branches per thousand carbon atoms in the first ethylene interpolymer ($SCB^1$) satisfy $$0.7 < \frac{SCB^2}{SCB^1} < 1.1$$

inequality.

An embodiment of the disclosure is an ethylene interpolymer product consisting of: from 40 to 80 weight % of a first ethylene interpolymer having a molecular weight distribution index of $$\frac{M_w}{M_n} < 2.3,$$

a solid-to-liquid transition temperature not greater than 112° C., a weighted Rheological Adhesion Parameter, $\mathcal{R}h_{adh}$ from 0.5 to 1.5; and from 20 to 60 weight % of a second ethylene interpolymer having a molecular weight distribution index of $$\frac{M_w}{M_n} > 2.3,$$

a solid-to-liquid transition temperature greater than 112° C., a weighted Rheological Adhesion Parameter, $\mathcal{R}h_{adh}$ from 1.5 to 2.5; wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 1.5.

An embodiment of the disclosure is an ethylene interpolymer product consisting of: from 40 to 80 weight % of a first ethylene interpolymer having a molecular weight distribution index of $$\frac{M_w}{M_n} < 2.3,$$

a solid-to-liquid transition temperature not greater than 112° C., a weighted Rheological Adhesion Parameter, $\mathcal{R}h_{adh}$ from 0.5 to 1.5; and from 20 to 60 weight % of a second ethylene interpolymer having a molecular weight distribution index of $$\frac{M_w}{M_n} > 2.3,$$

a solid-to-liquid transition temperature greater than 112° C., a weighted Rheological Adhesion Parameter, $\mathcal{R}h_{adh}$ from 1.5 to 2.5; wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{ash}$, greater than 2.5.

An embodiment of the disclosure is an ethylene interpolymer product having a soluble fraction in a temperature rising elution fractionation (TREF) analysis of less than 7 weight %.

An embodiment of the disclosure is an ethylene interpolymer product having a soluble fraction in a temperature rising elution fractionation (TREF) analysis of less than 5 weight %.

Embodiments of the disclosure include an ethylene interpolymer product having a weight average molecular weight from 50,000 to 250,000 g/mol.

An embodiment of the disclosure is an ethylene interpolymer product comprising: from 40 to 80 weight % of a first ethylene interpolymer having a molecular weight distribution index of $$\frac{M_w}{M_n} < 2.3$$

and a weight average molecular weight from 50,000 to 250,000 g/mol; and from 20 to 60 weight % of a second ethylene interpolymer having a molecular weight distribution index of $$\frac{M_w}{M_n} > 2.3$$

and a weight average molecular weight from 50,000 to 250,000 g/mol.

Embodiments of the disclosure include ethylene interpolymer products having a tallest melting peak in a differential scanning calorimetry (DSC) analysis below 105° C., specifically below 103° C. and more specifically below 102° C.

Embodiments of the disclosure include ethylene interpolymer products having a density from 0.880 to 0.930 g/cm$^3$.

Embodiments of the disclosure include ethylene interpolymer products having a density from 0.885 to 0.925 g/cm$^3$.

Embodiments of the disclosure include ethylene interpolymer products comprising a first ethylene interpolymer having a density $d_1$ from 0.855 to 0.945 g/cm$^3$ and a second ethylene interpolymer having a density $d_2$ from 0.855 to 0.945 g/cm$^3$, wherein said $d_1$ and $d_2$ satisfy $0 \le d_2 - d_1 \le 0.035$ g/cm$^3$ inequality.

Embodiments of the disclosure include ethylene interpolymer products comprising a first ethylene interpolymer having a density $d_1$ from 0.855 to 0.945 g/cm$^3$ and a second ethylene interpolymer having a density $d_2$ from 0.855 to 0.945 g/cm$^3$, wherein said $d_1$ and $d_2$ satisfy $0 \le d_2 - d_1 \le 0.030$ g/cm$^3$ inequality.

Embodiments of the disclosure include ethylene interpolymer products comprising a first ethylene interpolymer having a melt index 12 from 0.1 dg/min to 3 dg/min.

Embodiments of the disclosure include ethylene interpolymer products synthesized in a solution polymerization process. Embodiments of the disclosure include ethylene interpolymer products comprising from 0 to 10 mole percent of one or more α-olefins. Embodiments of the disclosure include ethylene interpolymer products comprising from 0 to 10 mole percent of $C_3$ to $C_{10}$ α-olefins. Embodiments of the disclosure include ethylene interpolymer products comprising from 0 to 10 mole percent of 1-hexene, 1-octene or a mixture of 1-hexene and 1-octene.

Embodiments of the disclosure include ethylene interpolymer products comprising from 40 to 80 weight % of a first ethylene interpolymer having a molecular weight distribution index of $$\frac{M_w}{M_n} < 2.3;$$

wherein the first ethylene interpolymer is synthesized using a single-site catalyst formulation comprising a component (i) defined by the formula"

$$(L^A)_aM(PI)_b(Q)_n$$

wherein $L^A$ is selected from the group consisting of unsubstituted cyclopentadienyl, substituted cyclopentadienyl, unsubstituted indenyl, substituted indenyl, unsubstituted fluorenyl and substituted fluorenyl; M is a metal selected from the group consisting of titanium, hafnium and zirconium; PI is a phosphinimine ligand; Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M; and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.

Embodiments of the disclosure include ethylene interpolymer products comprising from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the second ethylene interpolymer is synthesized using a heterogenous catalyst formulation; wherein the ethylene interpolymer product is characterized by a Dilution Index, $Y_d$, greater than 0 and a solid-to-liquid transition temperature not greater than 112° C.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; and a molecular weight distribution index from $$\left(\frac{M_w}{M_n}\right) 1.5 \text{ to } 5.0.$$

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; wherein ethylene interpolymer product has a storage modulus at a loss modulus of 500 Pa of no less than 12 Pa.

An embodiment of the disclosure is an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; wherein ethylene interpolymer product has a melt flow ratio (121/12) of less than 30.

Embodiments of the disclosure are a film layer having a thickness of from 0.5 to 10 mil, comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 1.5.

An embodiment of the disclosure is a film layer having a thickness of from 0.5 to 10 mil comprising an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 2.5.

An embodiment of the disclosure is a film layer having a thickness of from 0.5 to 10 mil comprising an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 3, a solid-to-liquid transition temperature not greater than 112° C.

An embodiment of the disclosure is a film layer having a thickness of from 0.5 to 10 mil comprising an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C.; wherein the weight average molecular weight of the second ethylene interpolymer $$(M_w^2)$$

and the weight average molecular weight of the first ethylene interpolymer $$(M_w^1)$$

satisfy $$1 \le \frac{M_w^2}{M_w^1} \le 2$$

inequality.

An embodiment of the disclosure is a film layer having a thickness of from 0.5 to 10 mil comprising an ethylene interpolymer product comprising:

from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0, a solid-to-liquid transition temperature not greater than 112° C.; wherein the weight average molecular weight of the second ethylene interpolymer $$(M_w^2)$$

and the weight average molecular weight of the first ethylene interpolymer $$(M_w^1)$$

satisfy $$1 \le \frac{M_w^2}{M_w^1} \le 2$$

inequality; and the number of short chain branches per thousand carbon atoms in the second ethylene interpolymer ($SCB^2$) and the number of short chain branches per thousand carbon atoms in the first ethylene interpolymer ($SCB^1$) satisfy $$0.7 < \frac{SCB^2}{SCB^1} < 1.1$$

inequality.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3,$$

a solid-to-liquid transition temperature not greater than 112° C., a weighted Rheological Adhesion Parameter, $\mathcal{R}h_{adh}$ from 1.5 to 2.5; and from 20 to 60 weight % of a second ethylene interpolymer having a molecular weight distribution index of $$\frac{M_w}{M_n} > 2.3,$$

a solid-to-liquid transition temperature greater than 112° C., a weighted Rheological Adhesion Parameter, $\mathcal{R}h_{adh}$ from 0.5 to 1.5; wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 1.5.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3,$$

a solid-to-liquid transition temperature not greater than 112° C., a weighted Rheological Adhesion Parameter, $\mathcal{R}h_{adh}$ from 1.5 to 2.5; and from 20 to 60 weight % of a second ethylene interpolymer having a molecular weight distribution index of $$\frac{M_w}{M_n} > 2.3,$$

a solid-to-liquid transition temperature greater than 112° C., a weighted Rheological Adhesion Parameter, $\mathcal{R}h_{adh}$ from 0.5 to 1.5; wherein the ethylene interpolymer product is characterized by a Dilution Index, $Y_d$, greater than 0, a solid-to-liquid transition temperature not greater than 112° C. and a weighted Rheological Adhesion Parameter, $\mathcal{R}h_{adh}$, greater than 2.5.

An embodiment of the disclosure is a film layer having a thickness of from 0.5 to 10 mil comprising an ethylene interpolymer product having a soluble fraction in a temperature rising elution fractionation (TREF) analysis of less than 7 weight %.

An embodiment of the disclosure is a film layer having a thickness of from 0.5 to 10 mil comprising an ethylene interpolymer product having a soluble fraction in a temperature rising elution fractionation (TREF) analysis of less than 5 weight %.

An embodiment of the disclosure is a film layer having a thickness of from 0.5 to 10 mil comprising an ethylene interpolymer product synthesized in a solution polymerization process. An embodiment of the disclosure is a film layer having a thickness of from 0.5 to 10 mil comprising an ethylene interpolymer product comprising from 0 to 10 mole percent of one or more α-olefins. An embodiment of the disclosure is a film layer having a thickness of from 0.5 to 10 mil comprising an ethylene interpolymer product comprising from 0 to 10 mole percent of $C_3$ to $C_{10}$ α-olefins. An embodiment of the disclosure is a film layer having a thickness of from 0.5 to 10 mil comprising an ethylene interpolymer product comprising from 0 to 10 mole percent of 1-hexene, 1-octene or a mixture of 1-hexene and 1-octene.

An embodiment of the disclosure is a film layer having a thickness of from 0.5 to 10 mil comprising an ethylene interpolymer product comprising from 40 to 80 weight % of a first ethylene interpolymer having a molecular weight distribution index of $$\frac{M_w}{M_n} < 2.3;$$

wherein the first ethylene interpolymer is synthesized using a single-site catalyst formulation; and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.

An embodiment of the disclosure is a film layer having a thickness of from 0.5 to 10 mil comprising an ethylene interpolymer product comprising from 40 to 80 weight % of a first ethylene interpolymer having a molecular weight distribution index of $$\frac{M_w}{M_n} < 2.3;$$

wherein the first ethylene interpolymer is synthesized using a single-site catalyst formulation comprising a component (i) defined by the formula:

$$(L^A)_aM(PI)_b(Q)_n$$

wherein $L^A$ is selected from the group consisting of unsubstituted cyclopentadienyl, substituted cyclopentadienyl, unsubstituted indenyl, substituted indenyl, unsubstituted fluorenyl and substituted fluorenyl; M is a metal selected from the group consisting of titanium, hafnium and zirconium; PI is a phosphinimine ligand; Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M; and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.

An embodiment of the disclosure is a film layer having a thickness of from 0.5 to 10 mil comprising an ethylene interpolymer product comprising from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the second ethylene interpolymer is synthesized using a heterogenous catalyst formulation; wherein the ethylene interpolymer product is characterized by a Dilution Index, $Y_d$, greater than 0 and a solid-to-liquid transition temperature not greater than 112° C.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; and a molecular weight distribution index from $$\left(\frac{M_w}{M_n}\right) 1.5 \text{ to } 5.0.$$

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; wherein ethylene interpolymer product has a storage modulus at a loss modulus of 500 Pa of no less than 12 Pa.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; wherein ethylene interpolymer product has a melt flow ratio (121/12) of less than 30.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; wherein said film layer is further characterized as having a haze value less than 6%, and; a Gloss at 45° value greater than 70.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; wherein said film layer is further characterized as having a hot tack seal onset temperature less than 90° C., and; a hot tack window at 2.5N measured on a 2 mil (50 μm) blown film no less than 30° C.

An embodiment of the disclosure is a film layer having a thickness of from 0.5 to 10 mil comprising an ethylene interpolymer product comprising: from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.; wherein said film layer is further characterized as having one or more of a slow puncture value no less than 110 J/mm on a 1 mil (25 μm) blown film according to ASTM D5748, and; a dart impact value no less than 700 g measured on a 1 mil (25 μm) blown film according to ASTM D 1709/A.

BRIEF DESCRIPTION OF THE DRAWINGS

The following Figures are presented for the purpose of illustrating selected embodiments of this disclosure. The embodiments in this disclosure are not limited to the precise arrangements and trends shown.

DEFINITION OF TERMS

Figure 1A:
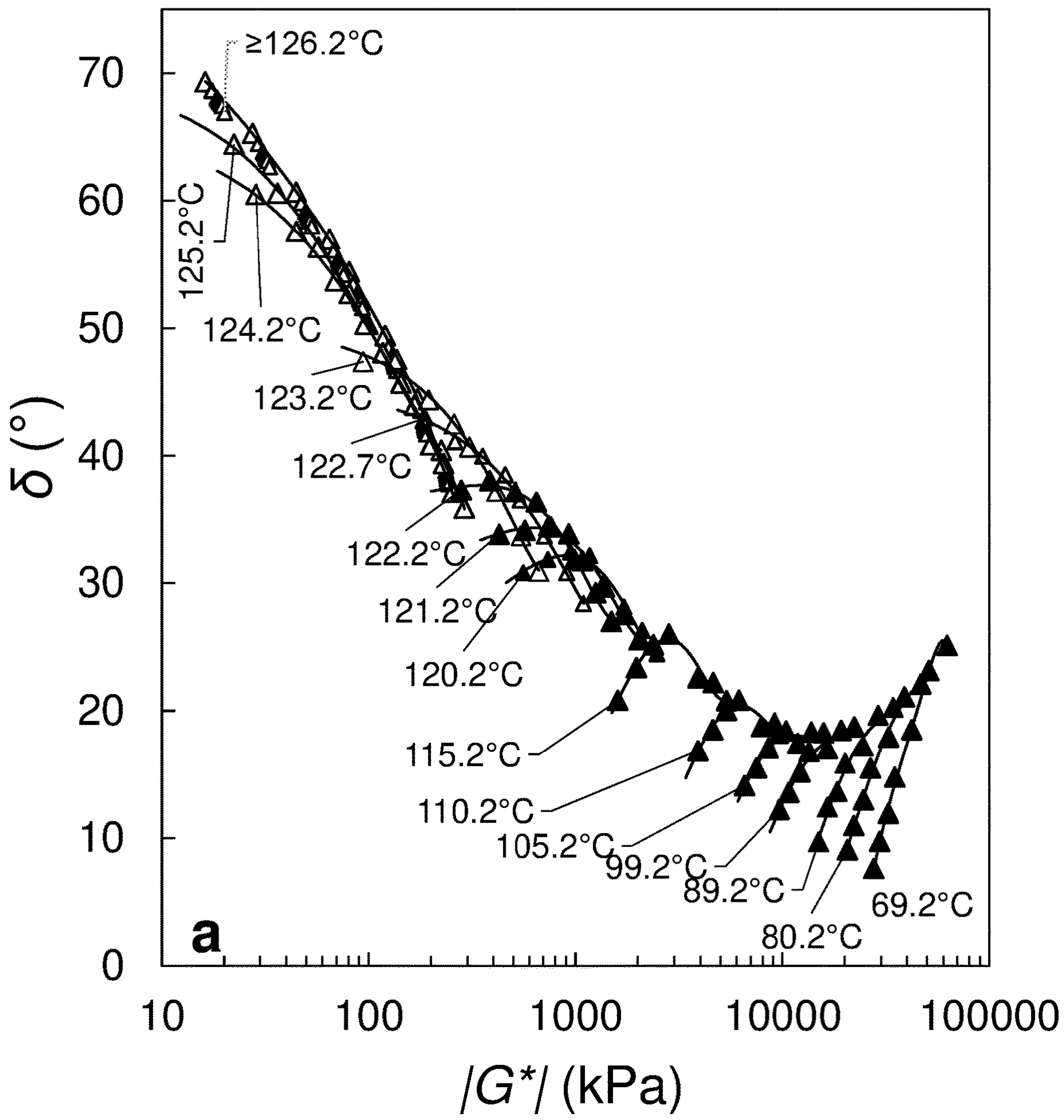
FIG. 1*a*, shows the vGP representation of the ethylene interpolymer B1 rheological response during heating after a cooling cycle from 140° C. to 60° C. at ±0.5 K/min under multi-wave oscillations.

Other than in the examples or where otherwise indicated, all numbers or expressions referring to quantities of ingredients, extrusion conditions, etc., used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin".

As used herein, the term "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. An "ethylene homopolymer" is made using only ethylene as a polymerizable monomer. The term "copolymer" refers to a polymer that contains two or more types of monomer. An "ethylene copolymer" is made using ethylene and one or more other types of polymerizable monomer. Common polyethylenes include high density polyethylene (HDPE), medium density polyethylene (MDPE), linear low density polyethylene (LLDPE), very low density polyethylene (VLDPE), ultralow density polyethylene (ULDPE), plastomer and elastomers. The term polyethylene also includes polyethylene terpolymers which may include two or more comonomers in addition to ethylene. The term polyethylene also includes combinations of, or blends of, the polyethylenes described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneously branched polyethylene" refers to a subset of polymers in the ethylene polymer group that are produced using a heterogeneous catalyst system; non-limiting examples of which include Ziegler-Natta or chromium catalysts, both of which are well known in the art.

The term "homogeneously branched polyethylene" refers to a subset of polymers in the ethylene polymer group that are produced using single-site catalysts; non-limiting examples of which include metallocene catalysts, phosphinimine catalysts, and constrained geometry catalysts all of which are well known in the art.

Typically, homogeneously branched polyethylene has narrow molecular weight distributions, for example gel permeation chromatography (GPC) $M_w/M_n$ values of less than 2.8, especially less than about 2.3, although exceptions may arise; $M_w$ and $M_n$ refer to weight and number average molecular weights, respectively. In contrast, the $M_w/M_n$ of heterogeneously branched ethylene polymers are typically greater than the $M_w/M_n$ of homogeneous polyethylene. In general, homogeneously branched ethylene polymers also have a narrow comonomer distribution, i.e. each macromolecule within the molecular weight distribution has a similar comonomer content. Frequently, the composition distribution breadth index "CDBI" is used to quantify how the comonomer is distributed within an ethylene polymer, as well as to differentiate ethylene polymers produced with different catalysts or processes. The "$CDBI_{50}$" is defined as the percent of ethylene polymer whose composition is within 50 weight percent (wt. %) of the median comonomer composition; this definition is consistent with that described in WO 93/03093 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the $CDBI_{50}$ of homogeneously branched ethylene polymers are greater than about 70% or greater than about 75%. In contrast, the $CDBI_{50}$ of α-olefin containing heterogeneously branched ethylene polymers are generally lower than the $CDBI_{50}$ of homogeneous ethylene polymers. For example, the $CDBI_{50}$ of a heterogeneously branched ethylene polymer may be less than about 75%, or less than about 70%.

It is well known to those skilled in the art, that homogeneously branched ethylene polymers are frequently further subdivided into "linear homogeneous ethylene polymers" and "substantially linear homogeneous ethylene polymers". These two subgroups differ in the amount of long chain branching: more specifically, linear homogeneous ethylene polymers have less than about 0.01 long chain branches per 1,000 carbon atoms; while substantially linear ethylene polymers have greater than about 0.01 to about 3.0 long chain branches per 1,000 carbon atoms. A long chain branch is macromolecular in nature, i.e. similar in length to the macromolecule that the long chain branch is attached to. Hereafter, in this disclosure, the term "homogeneously branched polyethylene" or "homogeneously branched ethylene polymer" refers to both linear homogeneous ethylene polymers and substantially linear homogeneous ethylene polymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl ($—CH_3$) and ethyl ($—CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{30}$ alkyl groups, $C_2$ to $C_{30}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

DESCRIPTION OF PREFERRED EMBODIMENTS

In an embodiment of the present disclosure, an ethylene interpolymer product will comprise at least the following types of polymers: a first ethylene interpolymer which is an ethylene copolymer and which has a $M_w/M_n$ of less than about 2.3; a second ethylene interpolymer which is different from the first ethylene interpolymer and which has a $M_w/M_n$ of greater than about 2.3. Each of these interpolymer components, and the ethylene interpolymer product of which they are each a part are further described below.

The First Ethylene Interpolymer

In an embodiment of the disclosure, the first ethylene interpolymer is made with a single site catalyst, non-limiting examples of which include phosphinimine catalysts, metallocene catalysts, and constrained geometry catalysts, all of which are well known in the art.

In an embodiment of the disclosure, the first ethylene interpolymer is an ethylene copolymer. Suitable alpha-olefins which may be copolymerized with ethylene to make an ethylene copolymer include 1-propene, 1-butene, 1-pentene, 1-hexene and 1-octene.

In an embodiment of the disclosure, the first ethylene interpolymer is a homogeneously branched ethylene copolymer.

In an embodiment of the disclosure, the first ethylene interpolymer is an ethylene/1-octene copolymer.

In an embodiment of the disclosure, the first ethylene interpolymer is made with a phosphinimine catalyst.

The catalyst components which make up the single site catalyst formulation are not particularly limited, i.e. a wide variety of catalyst components can be used. One non-limiting embodiment of a single site catalyst formulation comprises the following three or four components: a bulky ligand-metal complex; an alumoxane co-catalyst; an ionic activator and optionally a hindered phenol. In this disclosure, the term "component (i)" refers to the bulky ligand-metal complex, the term "component (ii)" refers to the alumoxane co-catalyst, the term "component (iii)" refers to the ionic activator; and the term "component (iv)" refers to the optional hindered phenol.

Non-limiting examples of component (i) are represented by formula (I):

$$(L^A)_a M(PI)_b(Q)_n \quad (I)$$

wherein ($L^A$) represents a bulky ligand; M represents a metal atom; PI represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of n-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

The phosphinimine ligand, PI, is defined by formula (II):

$$(R^P)_3 P=N- \quad (II)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —$Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_5$-10 aryl oxide radicals; these radicals may be linear, branched or cyclic or further substituted by halogen atoms, $C_{1-10}$ alkyl radicals, $C_{1-10}$ alkoxy radicals, $C_{6-10}$ arty or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i)

to a cationic complex. An equivalent term for "alumoxane" is "aluminoxane"; although the exact structure of this co-catalyst is uncertain, subject matter experts generally agree that it is an oligomeric species that contain repeating units of the general formula (III):

$$(R)_2AlO\text{-}(Al(R)\text{-}O)_n\text{-}Al(R)_2 \qquad (III)$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below;

$$[R^5]^+[B(R^7)_4]^- \qquad (IV)$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —$Si(R^9)_3$, where each $R^9$ is independently selected from hydrogen atoms and $C_{1-4}$ alkyl radicals; and compounds of formula (V):

$$[(R^8)_tZH]^+[B(R^7)_4]^- \qquad (V)$$

where B is a boron atom, H is a hydrogen atom, Z is a nitrogen or phosphorus atom, t is 2 or 3 and $R^5$ is selected from $C_{1-8}$ alkyl radicals, phenyl radicals which are unsubstituted or substituted by up to three $C_{1-4}$ alkyl radicals, or one $R^5$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst formulation the quantity and mole ratios of the three or four components, (i) through (iv) are optimized.

In an embodiment of the disclosure, the single site catalyst used to make the first ethylene interpolymer produces no long chain branches, and the first ethylene interpolymer will contain no long chain branches or an undetectable amount of long chain branches. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. A long chain branch is macromolecular in nature, i.e. a branch that has a length greater than the critical molecular weight for entanglement (i.e. 2 to 3 time larger than $M_e \cong 900$ g/mol for PE homopolymer) up to a branch that has a length similar to that of the macromolecule backbone that the long chain branch is attached to (see Doerpinghaus and Baird, Journal of Rheology 2003, 47, 717-736).

In embodiments of the disclosure the first ethylene interpolymer has a solid-to-liquid transition temperature with an upper limit no greater than 112° C., in some cases no greater than 110° C., in other cases 108° C. In embodiments of the disclosure the first ethylene interpolymer has a solid-to-liquid transition temperature with a lower limit greater than 80° C., in some cases greater than 90° C., in some other cases greater than 100° C.

In embodiments of the disclosure the first ethylene interpolymer has a weighted Rheological Adhesion Parameter, $\mathcal{R}h_{adh}$, with an upper limit no greater than 1.5, in some cases no greater than 1.4, in other cases 1.2. In embodiments of the disclosure the first ethylene interpolymer has a weighted Rheological Adhesion Parameter, $\mathcal{R}h_{adh}$, with a lower limit greater than 0.5, in some cases greater than 0.7, in some other cases greater than 0.9.

In embodiments of the disclosure the first ethylene interpolymer has a dilution index with an upper limit no greater than 11°, in some cases no greater than 10.5°, in other cases 10°. In embodiments of the disclosure the second ethylene interpolymer has a dilution index with a lower limit greater than 9.0°, in some cases greater than 9.1°, in some other cases greater than 9.15°.

In embodiments of the disclosure, the upper limit on the molecular weight distribution, $M_w/M_n$ of the first ethylene interpolymer may be about 2.8, or about 2.5, or about 2.4, or about 2.3, or about 2.2. In embodiments of the disclosure, the lower limit on the molecular weight distribution, $M_w/M_n$ of the first ethylene interpolymer may be about 1.4, or about 1.6, or about 1.7, or about 1.8, or about 1.9.

In embodiments of the disclosure, the first ethylene interpolymer has a molecular weight distribution, $M_w/M_n$ of <2.3, or <2.1, or <2.0 or about 2.0. In embodiments of the disclosure, the first ethylene interpolymer has a molecular weight distribution, $M_w/M_n$ of from about 1.7 to about 2.2.

In an embodiment of the disclosure, the first ethylene interpolymer has from 1 to 200 short chain branches per thousand carbon atoms ($SCB^1$). In further embodiments, the first ethylene interpolymer has from 3 to 150 short chain branches per thousand carbon atoms ($SCB^1$), or from 5 to 100 short chain branches per thousand carbon atoms ($SCB^1$), or from 10 to 100 short chain branches per thousand carbon atoms ($SCB^1$), or from 5 to 75 short chain branches per thousand carbon atoms ($SCB^1$), or from 10 to 75 short chain branches per thousand carbon atoms ($SCB^1$), or from 15 to 75 short chain branches per thousand carbon atoms ($SCB^1$), or from 20 to 75 short chain branches per thousand carbon atoms ($SCB^1$), or from 25 to 75 short chain branches per thousand carbon atoms ($SCB^1$). In still further embodiments, the first ethylene interpolymer has from 20 to 100 short chain branches per thousand carbon atoms ($SCB^1$), or from 25 to 100 short chain branches per thousand carbon atoms ($SCB^1$), or from 30 to 100 short chain branches per thousand carbon atoms ($SCB^1$), or from 35 to 100 short chain branches per thousand carbon atoms ($SCB^1$), or from 35 to 75 short chain branches per thousand carbon atoms ($SCB^1$), or from 30 to 75 short chain branches per thousand carbon atoms ($SCB^1$), or from 30 to 60 short chain branches per thousand carbon atoms ($SCB^1$), or from 30 to 50 short chain branches per thousand carbon atoms ($SCB^1$), or from 35 to 60 short chain branches per thousand carbon atoms ($SCB^1$), or from 35 to 55 short chain branches per thousand carbon atoms ($SCB^1$).

The short chain branching (i.e. the short chain branching per thousand carbons, $SCB^1$) is the branching due to the presence of an alpha-olefin comonomer in the polyethylene and will for example have two carbon atoms for a 1-butene comonomer, or four carbon atoms for a 1-hexene comonomer, or six carbon atoms for a 1-octene comonomer, etc.

In embodiments of the disclosure, the upper limit on the density of the first ethylene interpolymer $d_1$ may be about 0.945 g/cm$^3$; in some cases, about 0.940 g/cm$^3$; and in other cases about 0.935 g/cm$^3$. In embodiments of the disclosure, the lower limit on the density, $d_1$ of the first ethylene interpolymer may be about 0.855 g/cm$^3$, in some cases about 0.865 g/cm$^3$, and in other cases about 0.875 g/cm$^3$.

In embodiments of the disclosure the density, $d_1$ of the first ethylene interpolymer may be from about 0.855 to about 0.945 g/cm$^3$, or from 0.865 g/cm$^3$ to about 0.945 g/cm$^3$, or from about 0.870 g/cm$^3$ to about 0.940 g/cm$^3$, or from about 0.865 g/cm$^3$ to about 0.940 g/cm$^3$, or from about 0.865 g/cm$^3$ to about 0.940 g/cm$^3$, or from about 0.865 g/cm$^3$ to about 0.935 g/cm$^3$, or from about 0.860 g/cm$^3$ to about 0.930 g/cm$^3$, or from about 0.865 g/cm$^3$ to about 0.925 g/cm$^3$, or from about 0.865 g/cm$^3$ to about 0.920 g/cm$^3$, or from about 0.865 g/cm$^3$ to about 0.918 g/cm$^3$, or from about 0.865 g/cm$^3$ to about 0.916 g/cm$^3$, or from about 0.870 g/cm$^3$ to about 0.916 g/cm$^3$, or from about 0.865 g/cm$^3$ to about 0.912 g/cm$^3$, or from about 0.865 g/cm$^3$ to about 0.910 g/cm$^3$, or from about 0.865 g/cm$^3$ to about 0.905 g/cm$^3$, or from about 0.865 g/cm$^3$ to about 0.900 g/cm$^3$, or from about 0.855 g/cm$^3$ to about 0.900 g/cm$^3$, or from about 0.855 g/cm$^3$ to about 0.905 g/cm$^3$, or from about 0.855 g/cm$^3$ to about 0.910 g/cm$^3$, or from about 0.855 g/cm$^3$ to about 0.916 g/cm$^3$.

In embodiments of the disclosure, the upper limit on the $CDBI_{50}$ of the first ethylene interpolymer may be about 98 wt. %, in other cases about 95 wt. % and in still other cases about 90 wt. %. In embodiments of the disclosure, the lower limit on the $CDBI_{50}$ of the first ethylene interpolymer may be about 70 wt. %, in other cases about 75 wt. % and in still other cases about 80 wt. %.

In embodiments of the disclosure the melt index of the first ethylene interpolymer $I_2^1$ may be from about 0.01 dg/min to about 1,000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or less than about 5 dg/min, or less than about 3 dg/min, or less than about 1.0 dg/min, or less than about 0.75 dg/min, or less than about 0.50 dg/min.

In an embodiment of the disclosure, the first ethylene interpolymer has a weight average molecular weight, $M_w$ of from about 50,000 to about 300,000, or from about 50,000 to about 250,000, or from about 60,000 to about 250,000, or from about 70,000 to about 250,000 or from about 60,000 to about 220,000, or from about 70,000 to about 200,000, or from about 75,000 to about 200,000, or from about 75,000 to about 175,000; or from about 70,000 to about 175,000, or from about 70,000 to about 150,000.

In embodiments of the disclosure, the upper limit on the weight percent (wt. %) of the first ethylene interpolymer in the ethylene interpolymer product (i.e. the weight percent of the first ethylene interpolymer based on the total weight of the first and the second ethylene interpolymer) may be about 80 wt. %, or about 75 wt. %, or about 70 wt. %, or about 65 wt. %, or about 60 wt. %. In embodiments of the disclosure, the lower limit on the wt. % of the first ethylene interpolymer in the ethylene interpolymer product may be about 40 wt. %, or about 45 wt. %, or about 50 wt. %, or about 55 wt. %.

The Second Ethylene Interpolymer

In an embodiment of the disclosure, the second ethylene interpolymer is made with a multi-site catalyst system, non-limiting examples of which include Ziegler-Natta catalysts and chromium catalysts, both of which are well known in the art.

In an embodiment of the disclosure, the second ethylene interpolymer is made with a Ziegler-Natta catalyst.

In an embodiment of the disclosure, the second ethylene interpolymer is an ethylene copolymer. Suitable alpha-olefins which may be copolymerized with ethylene to give the third polyethylene include 1-propene, 1-butene, 1-pentene, 1-hexene and 1-octene.

In an embodiment of the disclosure, the second ethylene interpolymer is an ethylene homopolymer.

In an embodiment of the disclosure, the second ethylene interpolymer is a heterogeneously branched ethylene copolymer.

In an embodiment of the disclosure, the second ethylene interpolymer is an ethylene/1-octene copolymer.

In embodiments of the disclosure, the second ethylene interpolymer has a molecular weight distribution, $M_w/M_n$ of 2.3, or >2.3, or 2.5, or >2.5, or 2.7, or >2.7, or 2.9, or >2.9, or 3.0, or 3.0. In embodiments of the disclosure, the third polyethylene has a molecular weight distribution, $M_w/M_n$ of from 2.3 to 7.0, or from 2.5 to 7.0, or from 2.3 to 6.5, or from 2.3 to 6.0, or from 2.3 to 5.5, or from 2.3 to 5.0, or from 2.3 to 4.5, or from 2.5 to 6.5, or from 2.5 to 6.0, or from 2.5 to 5.5, or from 2.5 to 5.0, or from 2.5 to 4.5, or from 2.7 to 6.5, or from 2.7 to 6.0, or from 2.7 to 5.5, or from 2.7 to 5.0, or from 2.7 to 4.5, or from 2.9 to 6.5, or from 2.9 to 6.0, or from 2.9 to 5.5, or from 2.9 to 5.0, or from 2.9 to 4.5.

In an embodiment of the disclosure, the second ethylene interpolymer has from 0 to 100 short chain branches per thousand carbon atoms ($SCB^2$). In further embodiments, the second ethylene interpolymer has from 1 to 100 short chain branches per thousand carbon atoms ($SCB^2$), or from 1 to 75 short chain branches per thousand carbon atoms ($SCB^2$), or from 1 to 50 short chain branches per thousand carbon atoms ($SCB^2$). In further embodiments, the second ethylene interpolymer has from 0 to 100 short chain branches per thousand carbon atoms ($SCB^2$), or from 0 to 75 short chain branches per thousand carbon atoms ($SCB^2$), or from 3 to 75 short chain branches per thousand carbon atoms ($SCB^2$), or from 5 to 75 short chain branches per thousand carbon atoms ($SCB^2$), or from 3 to 50 short chain branches per thousand carbon atoms ($SCB^2$), or from 5 to 50 short chain branches per thousand carbon atoms ($SCB^2$).

The short chain branching (i.e. the short chain branching per thousand carbons, ($SCB^2$), if present, is the branching due to the presence of alpha-olefin comonomer in the polyethylene and will for example have two carbon atoms for a 1-butene comonomer, or four carbon atoms for a 1-hexene comonomer, or six carbon atoms for a 1-octene comonomer, etc.

In embodiments of the disclosure, the number of short chain branches per thousand carbon atoms in the second ethylene interpolymer ($SCB^2$) is greater than the number of short chain branches per thousand carbon atoms in the first ethylene interpolymer ($SCB^1$).

In embodiments of the disclosure, the number of short chain branches per thousand carbon atoms in the second ethylene interpolymer ($SCB^2$) is less than the number of short chain branches per thousand carbon atoms in the first ethylene interpolymer ($SCB^1$).

In embodiments of the disclosure, number of short chain branches per thousand carbon atoms in the second ethylene interpolymer ($SCB^2$) and the number of short chain branches per thousand carbon atoms in the first ethylene interpolymer ($SCB^1$) satisfy $$0.7 < \frac{SCB^2}{SCB^1} < 1.1$$

inequality; in some cases satisfy $$0.75 < \frac{SCB^2}{SCB^1} < 1.07$$

inequality; or in other cases satisfy $$0.8 < \frac{SCB^2}{SCB^1} < 1.05$$

inequality.

In embodiments of the disclosure the second ethylene interpolymer has a solid-to-liquid transition temperature with an upper limit no greater than 130° C., in some cases no greater than 125° C., in other cases 123° C. In embodiments of the disclosure the second ethylene interpolymer has a solid-to-liquid transition temperature with a lower limit greater than 112° C., in some cases greater than 113° C., in some other cases greater than 115° C.

In embodiments of the disclosure the second ethylene interpolymer has a weighted Rheological Adhesion Parameter, $\mathcal{R}h_{adh}$, with an upper limit no greater than 2.5, in some cases no greater than 2.4, in other cases 2.3. In embodiments of the disclosure the second ethylene interpolymer has a weighted Rheological Adhesion Parameter, $\mathcal{R}h_{adh}$, with a lower limit greater than 1.7, in some cases greater than 1.6, in some other cases greater than 1.5.

In embodiments of the disclosure the second ethylene interpolymer has a dilution index with an upper limit no greater than 1°, in some cases no greater than 0.5°, in other cases 0°. In embodiments of the disclosure the second ethylene interpolymer has a dilution index with a lower limit greater than −3° in some cases greater than −2°, in some other cases greater than −1.5°.

In embodiments of the disclosure, the upper limit on the density of the second ethylene interpolymer $d_2$ may be about 0.945 g/cm$^3$; in some cases, about 0.945 g/cm$^3$; and in other cases about 0.940 g/cm$^3$. In embodiments of the disclosure, the lower limit on the density of the second ethylene interpolymer $d_2$ may be about 0.855 g/cm$^3$, in some cases about 0.865 g/cm$^3$; and in other cases about 0.875 g/cm$^3$.

In embodiments of the disclosure the density of the second ethylene interpolymer $d_2$ may be from about 0.855 g/cm$^3$ to about 0.940 g/cm$^3$, or from about 0.875 g/cm$^3$ to about 0.940 g/cm$^3$, or from about 0.875 g/cm$^3$ to 0.930 g/cm$^3$, or from about 0.865 g/cm$^3$ to about 0.930 g/cm$^3$, or from about 0.865 g/cm$^3$ to about 0.925 g/cm$^3$, or from about 0.865 g/cm$^3$ to about 0.920 g/cm$^3$, or from about 0.865 g/cm$^3$ to about 0.918 g/cm$^3$, or from about 0.865 g/cm$^3$ to about 0.916 g/cm$^3$, or from about 0.865 g/cm$^3$ to about 0.912 g/cm$^3$, or from about 0.875 g/cm$^3$ to about 0.925 g/cm$^3$, or from about 0.875 g/cm$^3$ to about 0.916 g/cm$^3$, or from about 0.865 g/cm$^3$ to about 0.912 g/cm$^3$, or from about 0.880 g/cm$^3$ to about 0.912 g/cm$^3$, or from about 0.890 g/cm$^3$ to about 0.916 g/cm$^3$, or from about 0.900 g/cm$^3$ to about 0.916 g/cm$^3$, or from about 0.880 g/cm$^3$ to about 0.916 g/cm$^3$, or from about 0.880 g/cm$^3$ to about 0.918 g/cm$^3$, or from about 0.880 g/cm$^3$ to about 0.921 g/cm$^3$, or from about 0.880 g/cm$^3$ to about 0.926 g/cm$^3$, or from about 0.880 g/cm$^3$ to about 0.930 g/cm$^3$, or from about 0.880 g/cm$^3$ to about 0.935 g/cm$^3$.

In embodiments of the disclosure the density of the second ethylene interpolymer $d_2$ and the density of the first ethylene interpolymer $d_1$ satisfy $0 \le d_2-d_1 \le 0.035$ g/cm$^3$ inequality, or $0 \le d_2-d_1 \le 0.030$ g/cm$^3$ inequality, or $0 \le d_2-d_1 \le 0.028$ g/cm$^3$ inequality, $0 \le d_2-d_1 \le 0.025$ g/cm$^3$ inequality, $0 \le d_2-d_1 \le 0.024$ g/cm$^3$ inequality, or $0 \le d_2-d_1 \le 0.023$ g/cm$^3$ inequality.

In an embodiment of the disclosure, the second ethylene interpolymer is an ethylene copolymer which has a composition distribution breadth index, $CDBI_{50}$ of 75 wt. % or less, or 70 wt. % or less. In further embodiments of the disclosure, the second ethylene interpolymer is an ethylene copolymer which has a $CDBI_{50}$ of 65 wt. % or less, or 60 wt. % or less, or 55 wt. % or less, or 50 wt. % or less, or 45 wt. % or less.

In embodiments of the disclosure the melt index of the second ethylene interpolymer $I_2^2$ may be from about 0.01 dg/min to about 1000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or less than about 5 dg/min, or less than about 3 dg/min, or less than about 1.0 dg/min, or less than about 0.75 dg/min, or less than about 0.50 dg/min.

In an embodiment of the disclosure, the second ethylene interpolymer has a weight average molecular weight, $M_w$ of from about 50,000 to about 350,000, or from about 50,000 to about 300,000, or from 50,000 to 250,000, or from about 100,000 to about 300,000, or from about 125,000 to about 275,000, or from about 100,000 to about 275,000, or from about 100,000 to about 250,000; or from about 100,000 to about 225,000, or from about 125,000 to about 275,000, or from 125,000 to about 250,000, or from about 100,000 to about 240,000 or from about 150,000 to about 250,000.

In an embodiment of the disclosure, the second ethylene interpolymer has a weight average molecular weight $$M_w^2$$

which is greater than or equal the weight average molecular weight of the first ethylene interpolymer $$M_w^1.$$

In an embodiment of the disclosure, the second and first ethylene interpolymers have weight average molecular weights $$M_w^2 \text{ and } M_w^1$$

satisfying $$1 \le \frac{M_w^2}{M_w^1} \le 2$$

inequality; in some cases satisfying $$1 \le \frac{M_w^2}{M_w^1} \le 1.5$$

inequality; in some other cases satisfying $$1 \le \frac{M_w^2}{M_w^1} \le 1.3$$

inequality.

In embodiments of the disclosure, the upper limit on the weight percent (wt. %) of the second ethylene interpolymer in the ethylene interpolymer product (i.e. the weight percent of the second ethylene interpolymer based on the total weight of the first and the second) may be about 60 wt. %, or about 55 wt. %, or about 50 wt. %, or about 45 wt. %, or 40 wt. %. In embodiments of the disclosure, the lower limit on the wt. % of the second ethylene interpolymer in the final ethylene interpolymer product may be about 20 wt. %, or about 25 wt. %, or about 30 wt. %, or about 35 wt. %.

The Ethylene Interpolymer Product

The ethylene interpolymer product disclosed herein can be made using any well-known techniques in the art, including but not limited to melt blending, solution blending, or in-reactor blending to bring together a first ethylene interpolymer and a second ethylene interpolymer.

In an embodiment, the ethylene interpolymer product of the present disclosure is made by melt blending or solution blending two different components: i) a first ethylene interpolymer; and ii) a second ethylene interpolymer.

In an embodiment, the first ethylene interpolymer of the present disclosure is made using a single site catalyst in a reactor and the second ethylene interpolymer is made using a multi-site catalyst in another reactor.

It is also contemplated by the present disclosure, that the ethylene interpolymer product comprising a first and a second ethylene interpolymer could be made in one or more polymerization reactor(s), using a single site polymerization catalyst and a multi-site polymerization catalyst, where each catalyst has a different response to one or more of hydrogen concentration, ethylene concentration, comonomer concentration, and temperature under a given set of polymerization conditions, so that the first ethylene interpolymer is produced by the single site catalyst and the second ethylene interpolymer is produced by the multi-site catalyst.

In an embodiment, the ethylene interpolymer product of the present disclosure is made by forming a first ethylene interpolymer in a first reactor by polymerizing ethylene and an alpha olefin with a single site catalyst; and forming a second ethylene interpolymer in a second reactor by polymerizing ethylene and an alpha olefin with a multi-site catalyst.

In an embodiment, the ethylene interpolymer product of the present disclosure is made by forming a first ethylene interpolymer in a first reactor by polymerizing ethylene and an alpha olefin with a single site catalyst; and forming a second ethylene interpolymer in a second reactor by polymerizing ethylene and an alpha olefin with a multi-site catalyst, where the first and the second reactors are configured in series with one another.

In an embodiment, the ethylene interpolymer product of the present disclosure is made by forming a first ethylene interpolymer in a first solution phase polymerization reactor by polymerizing ethylene and an alpha olefin with a single site catalyst, and forming a second ethylene interpolymer in a second solution phase polymerization reactor by polymerizing ethylene and an alpha olefin with a multi-site catalyst, where the first and second solution phase polymerization reactors are configured in parallel to one another.

In an embodiment, the ethylene interpolymer product of the present disclosure is made by forming a first ethylene interpolymer in a first solution phase polymerization reactor by polymerizing ethylene and an alpha olefin with a single site catalyst, and forming a second ethylene interpolymer in a second solution phase polymerization reactor by polymerizing ethylene and an alpha olefin with a multi-site catalyst, where the first and second solution phase polymerization reactors are configured in series with one another.

In an embodiment, the solution phase polymerization reactor used as a first solution phase reactor and a second solution phase reactor is a continuously stirred tank reactor.

In an embodiment, the ethylene interpolymer product of the present disclosure is made by forming a first ethylene interpolymer in a first solution phase polymerization reactor by polymerizing ethylene and an alpha olefin with a single site catalyst, and forming a second ethylene interpolymer in a second solution phase polymerization reactor by polymerizing ethylene and an alpha olefin with a multi-site catalyst; and optionally, a third ethylene interpolymer is formed in an optional third reactor, wherein an optional multi-site catalyst formulation may be employed.

In an embodiment, the solution phase polymerization reactor used as a first solution phase reactor, a second solution phase reactor, or a third solution phase reactor is a tubular reactor.

In a solution phase polymerization reactor, a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, cyclopentane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

In embodiments of the disclosure, the ethylene interpolymer product has a density which may be from about 0.880 g/cm$^3$ to about 0.930 g/cm$^3$, or from about 0.885 g/cm$^3$ to about 0.925 g/cm$^3$, or from about 0.890 g/cm$^3$ to 0.920 g/cm$^3$, or from about 0.895 g/cm$^3$ to about 0.920 g/cm$^3$, or from about 0.900 g/cm$^3$ to about 0.916 g/cm$^3$, or from about 0.905 g/cm$^3$ to about 0.914 g/cm$^3$, or from about 0.910 g/cm$^3$ to about 0.912 g/cm$^3$, or from about 0.910 g/cm$^3$ to about 0.920 g/cm$^3$, or from about 0.910 g/cm$^3$ to about 0.926 g/cm$^3$, or from about 0.890 g/cm$^3$ to about 0.924 g/cm$^3$, or from about 0.890 g/cm$^3$ to about 0.922 g/cm$^3$, or from about 0.890 g/cm$^3$ to about 0.920 g/cm$^3$, or from about 0.890 g/cm$^3$ to about 0.918 g/cm$^3$, or from about 0.880 g/cm$^3$ to about 0.922 g/cm$^3$, or from about 0.880 g/cm$^3$ to about 0.926 g/cm$^3$, or from about 0.880 g/cm$^3$ to about 0.932 g/cm$^3$, or 0.930 g/cm$^3$, or <0.930 g/cm$^3$, or 0.925 g/cm$^3$, or <0.925 g/cm$^3$.

In embodiments of the disclosure the melt index 12 of the ethylene interpolymer product may be from about 0.01 dg/min to about 1,000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or from about 0.1 dg/min to about 10 dg/min, or from about 0.1 dg/min to about 5 dg/min, or from about 0.1 dg/min to about 3 dg/min, or from about 0.1 dg/min to about 2 dg/min, or from about 0.1 dg/min to about 1.5 dg/min, or from about 0.1 dg/min to about 1 dg/min, or less than about 5 dg/min, or less than about 3 dg/min, or less than about 1.0 dg/min.

In embodiments of the disclosure the high load melt index 121 of the ethylene interpolymer product may be from about 10 dg/min to about 10,000 dg/min, or from about 10 dg/min to about 1,000 dg/min, or from about 10 dg/min to about 100 dg/min, or from about 10 dg/min to about 75 dg/min, or from about 10 dg/min to about 50 dg/min, or from about 10 dg/min to about 30 dg/min.

In an embodiment of the disclosure the melt flow ratio 121/12 of the ethylene interpolymer product is less than 40. In an embodiment of the disclosure the melt flow ratio 121/12 of the ethylene interpolymer product is less than 30. In embodiments of the disclosure the melt flow ratio 121/12 of the ethylene interpolymer product may be from greater than 10 to 40, or from greater than 10 to 30, or from 10 to about 25, or from 10 to 20.

In embodiments of the disclosure, the ethylene interpolymer product has a weight average molecular weight, $M_w$ of from about 50,000 to about 300,000, or from about 50,000 to about 250,000, or from about 60,000 to about 250,000, or from about 70,000 to about 225,000, or from about 70,000 to about 200,000, or from about 75,000 to about 175,000, or from about 75,000 to about 150,000, or from about 100,000 to about 130,000.

In embodiments of the disclosure, the ethylene interpolymer product has a lower limit molecular weight distribution, $M_w/M_n$ of 1.5, or 2.0, or 2.3. In embodiments of the disclosure, the ethylene interpolymer product has an upper limit molecular weight distribution, $M_w/M_n$ of 5.0, or 4.5, or 4.0, or 3.5, or 3.0. In embodiments of the disclosure, the ethylene interpolymer product has a molecular weight distribution, $M_w/M_n$ of from 1.5 to 5.0, or from 1.6 to 4.0, of from 1.7 to 3.5, or from 1.7 to 3.0.

In an embodiment of the disclosure, the ethylene interpolymer product has a tallest melting peak in a differential scanning calorimetry (DSC) analysis below 105° C. For clarity sake, by the phrase "has a tallest melting peak in an DSC analysis" it is meant that in a DSC analysis, although there may be one or more melting peaks evident, the peak with the maximum heat-flow (measured in W/g) with respect to the linear baseline drawn between 20° C. and end of melting occurs below the indicated temperature. In an embodiment of the disclosure, the ethylene interpolymer product has a tallest melting peak in a differential scanning calorimetry (DSC) analysis at below 103° C. In an embodiment of the disclosure, the ethylene interpolymer product has a tallest melting peak in a differential scanning calorimetry (DSC) analysis below 102° C.

In embodiments of the disclosure the ethylene interpolymer product has a solid-to-liquid transition temperature with an upper limit no greater than 112° C., in some cases no greater than 110° C., in other cases 108° C. In embodiments of the disclosure the first ethylene interpolymer has a solid-to-liquid transition temperature with a lower limit greater than 80° C., in some cases greater than 90° C., in some other cases greater than 95° C.

In embodiments of the disclosure the ethylene interpolymer product has a weighted Rheological Adhesion Parameter, $\mathcal{R}h_{adh}$, with an upper limit no greater than 5.0, in some cases no greater than 4.5, in other cases 4.0. In embodiments of the disclosure the first ethylene interpolymer has a weighted Rheological Adhesion Parameter, $\mathcal{R}h_{adh}$, with a lower limit greater than 2.5, in some cases greater than 2.0, in some other cases greater than 1.5.

In an embodiment of the disclosure, the ethylene interpolymer product has a unimodal profile in a gel permeation chromatograph generated according to the method of ASTM D6474-99. The term "unimodal" is herein defined to mean there will be only one significant peak or maximum evident in the GPC-curve. A unimodal profile includes a broad unimodal profile. Alternatively, the term "bimodal" connotes the presence of two maxima in a molecular weight distribution curve generated according to the method of ASTM D6474-99. The term "multi-modal" denotes the presence of two or more, typically more than two, maxima in a molecular weight distribution curve generated according to the method of ASTM D6474-99.

In an embodiment of the disclosure, the ethylene interpolymer product will have a reverse or partially reverse comonomer distribution profile as measured using GPC-FTIR. If the comonomer incorporation decreases with molecular weight, as measured using GPC-FTIR, the distribution is described as "normal". If the comonomer incorporation is approximately constant with molecular weight, as measured using GPC-FTIR, the comonomer distribution is described as "flat" or "uniform". The term "reverse(d) comonomer distribution" is used herein to mean, that across the molecular weight range of an ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse". A partially reverse comonomer distribution will exhibit a peak or maximum.

In an embodiment of the disclosure the ethylene interpolymer product has a reversed comonomer distribution profile as measured using GPC-FTIR.

In an embodiment of the disclosure the ethylene interpolymer product has a partially reversed comonomer distribution profile as measured using GPC-FTIR.

In an embodiment of the disclosure the ethylene interpolymer product has a partially flat comonomer distribution profile as measured using GPC-FTIR.

In an embodiment of the disclosure the ethylene interpolymer product has a partially normal comonomer distribution profile as measured using GPC-FTIR.

In an embodiment of the disclosure the ethylene interpolymer product has a normal comonomer distribution profile as measured using GPC-FTIR.

In an embodiment of the disclosure, the ethylene interpolymer product has a soluble fraction of at least 5 wt. % in a TREF analysis, where the soluble fraction is defined as the weight percent (wt. %) of material which elutes at 30° C. and below.

In an embodiment of the disclosure, the ethylene interpolymer product has a soluble fraction of at least 7 wt. % in a TREF analysis, where the soluble fraction is defined as the weight percent (wt. %) of material which elutes at 30° C. and below.

In an embodiment of the disclosure, the ethylene interpolymer product has a stress exponent, defined as $Log_{10}[I_6/I_2]/Log_{10}[6.48/2.16]$, which is 1.25. In further embodiments of the disclosure the ethylene interpolymer product has a stress exponent, $Log_{10}[I_6/I_2]/Log_{10}[6.48/2.16]$ of less than 1.23, or less than 1.21.

The ethylene interpolymer product disclosed herein may be converted into flexible manufactured articles such as monolayer or multilayer films, such films are well known to those experienced in the art; non-limiting examples of processes to prepare such films include blown film and cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however, the various thermoplastic materials are metered into a flat die and extruded into a monolayer or multilayer sheet, rather than a tube. In the cast film process the extruded sheet is solidified on a chill roll.

Depending on the end-use application, the disclosed ethylene interpolymer product may be converted into films that span a wide range of thicknesses. Non-limiting examples include, food packaging films where thicknesses may range from about 0.5 mil (13 μm) to about 4 mil (102 μm), and; in heavy duty sack applications film thickness may range from about 2 mil (51 μm) to about 10 mil (254 μm).

The ethylene interpolymer product disclosed herein may be used in monolayer films; where the monolayer may contain more than one ethylene interpolymer product and/or additional thermoplastics; non-limiting examples of thermoplastics include polyethylene polymers and propylene polymers. The lower limit on the weight percent of the ethylene interpolymer product in a monolayer film may be about 3 wt. %, in other cases about 10 wt. % and in still other cases about 30 wt. %. The upper limit on the weight percent of the ethylene interpolymer product in the monolayer film may be 100 wt. %, in other cases about 90 wt. % and in still other cases about 70 wt. %.

The ethylene interpolymer product disclosed herein may also be used in one or more layers of a multilayer film; non-limiting examples of multilayer films include three, five, seven, nine, eleven or more layers. The thickness of a specific layer (containing the ethylene interpolymer product) within a multilayer film may be about 5%, in other cases about 15% and in still other cases about 30% of the total multilayer film thickness. In other embodiments, the thickness of a specific layer (containing the ethylene interpolymer product) within a multilayer film may be about 95%, in other cases about 80% and in still other cases about 65% of the total multilayer film thickness. Each individual layer of a multilayer film may contain more than one ethylene interpolymer product and/or additional thermoplastics.

Additional embodiments include laminations and coatings, wherein mono or multilayer films containing the disclosed ethylene interpolymer product are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of a ethylene interpolymer product containing web to a polyester or polyamide web. Prior to lamination, the web containing the disclosed ethylene interpolymer product(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include polyamide, polyester and polypropylene, or webs containing barrier resin layers such as EVOH. Such webs may also contain a vapor deposited barrier layer; for example, a thin silicon oxide ($SiO_x$) or aluminum oxide ($AlO_x$) layer. Multilayer webs (or films) may contain three, five, seven, nine, eleven or more layers.

The ethylene interpolymer product disclosed herein can be used in a wide range of manufactured articles comprising one or more films or film layers (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles comprising one or more films containing at least one ethylene interpolymer product include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed ethylene interpolymer product.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat-sealing properties are desired in high speed vertical and horizontal form-fill-seal processes that load and seal a commercial product (liquid, solid, paste, part, etc.) inside a pouch-like package.

In addition to desired film physical properties, it is desired that the disclosed ethylene interpolymer product is easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

In an embodiment of the disclosure, a film or film layer comprises the ethylene interpolymer product described above.

In embodiments of the disclosure, a film or film layer comprises the ethylene interpolymer product described above and has a thickness of from 0.5 to 10 mil.

In embodiments of the disclosure, a film or film layer has a thickness of from 0.5 to 10 mil.

In embodiments of the disclosure, a film will have a dart impact strength of ≥700 g/mil, or ≥750 g/mil, or ≥800 g/mil, or ≥900 g/mil. In another embodiment of the disclosure, a film will have a dart impact strength of from 700 g/mil to 1,500 g/mil. In a further embodiment of the disclosure, a film will have dart impact strength of from 750 g/mil to 1,500 g/mil. In a further embodiment of the disclosure, a film will have dart impact strength of from 800 g/mil to 1,450 g/mil. In a further embodiment of the disclosure, a film will have dart impact strength of from 700 g/mil to 1,450 g/mil. In yet another embodiment of the disclosure, the film will have dart impact strength of from 700 g/mil to 1,400 g/mil.

In embodiments of the disclosure, a 1 mil film will have a machine direction (MD) secant modulus at 1% strain of 150 MPa, or 170 MPa, or 230 MPa. In another embodiment of the disclosure, a 1 mil film will have a machine direction (MD) secant modulus at 1% strain of from 60 MPa to 230 MPa. In an embodiment of the disclosure, a 1 mil film will have a machine direction (MD) secant modulus at 1% strain of from 70 MPa to 230 MPa. In an embodiment of the disclosure, a 1 mil film will have a machine direction (MD) secant modulus at 1% strain of from 90 MPa to 230 MPa. In another embodiment of the disclosure, a 1 mil film will have a machine direction (MD) secant modulus at 1% strain of from 0 MPa to 230 MPa.

In an embodiment of the disclosure, a 1 mil film will have a transverse direction (TD) secant modulus at 1% strain of ≥160 MPa, or ≥1800 MPa, or ≥240 MPa. In an embodiment of the disclosure, a 1 mil film will have a transverse direction (TD) secant modulus at 1% strain of from 60 MPa to 240 MPa. In another embodiment of the disclosure, a 1 mil film will have a transverse direction (TD) secant modulus at 1% strain of from 70 MPa to 230 MPa. In another embodiment of the disclosure, a 1 mil film will have a transverse direction (TD) secant modulus at 1% strain of from 0 MPa to 240 MPa.

In embodiments of the disclosure, a 1 mil film will have a machine direction (MD) tensile strength at break of ≥40 MPa, or ≥42 MPa, or ≥44 MPa, or ≥46 MPa, or ≥48, or ≥50 MPa, or ≥55 MPa. In an embodiment of the disclosure, a 1 mil film will have a machine direction tensile strength at break of from 30 MPa to 70 MPa. In an embodiment of the disclosure, a 1 mil film will have a machine direction (MD) tensile strength at break of from 35 MPa to 65 MPa. In another embodiment of the disclosure, a 1 mil film will have a machine direction (MD) tensile strength at break of from 40 MPa to 65 MPa.

In embodiments of the disclosure, a film will have a machine direction (MD) tear strength≥110 g/mil, or ≥120 g/mil, or ≥130 g/mil, or ≥140 g/mil, or ≥150 g/mil, or 175 g/mil. In an embodiment of the disclosure, a film will have a machine direction (MD) tear strength of from 100 g/mil to 280 g/mil.

In embodiments of the disclosure, a 1 mil film will have a slow puncture resistance value of ≥50 J/mm, or ≥55 J/mm, or ≥60 J/mm, or ≥65 J/mm. In embodiments of the disclosure, a 1 mil film will have a slow puncture value of from 50 J/mm to 180 J/mm, or from 55 J/mm to 180 J/mm, or from 60 J/mm to 180 J/mm.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

The following examples are presented for the purpose of illustrating selected embodiments of this disclosure; it being understood that the examples presented do not limit the claims presented.

EXAMPLES

Test Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials. Density was determined using ASTM D792-13 (Nov. 1, 2013).

Melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship: S.Ex.=log ($I_6/I_2$)/log(6480/2160); wherein $I_6$ and $I_2$ are the melt flow rates measured at 190° C. using 6.48 kg and 2.16 kg loads, respectively.

$M_n$, $M_w$ and $M_z$ (g/mol) were determined by high temperature Gel Permeation Chromatography (GPC) with differential refractive index (DRI) detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, $M_W/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

High temperature GPC equipped with an online FTIR detector (GPC-FTIR) was used to measure the average comonomer content as well as comonomer content as a function of molecular weight.

The "Composition Distribution Branching Index" or "CDBI" may alternatively by determined using a crystal-TREF unit commercially available form Polymer Char (Valencia, Spain). The acronym "TREF" refers to Temperature Rising Elution Fractionation. A sample of the polymer sample (80 to 100 mg) was placed in the reactor of the Polymer Char crystal-TREF unit, the reactor was filled with 35 mL of 1,2,4-trichlorobenzene (TCB), heated to 150° C. and held at this temperature for 2 hours to dissolve the sample. An aliquot of the TCB solution (1.5 mL) was then loaded into the Polymer Char TREF column filled with stainless steel beads and the column was equilibrated for 45 minutes at 110° C. The sample was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized polymer was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer Char software a TREF distribution curve was generated as the polymer sample was eluted from the TREF column, i.e. a TREF distribution curve is a plot of the quantity (or intensity) of polymer composition eluting from the column as a function of TREF elution temperature. The soluble fraction is reported as the eluted fraction below 30° C. A $CDBI_{50}$ may be calculated from the TREF distribution curve for each polymer composition analyzed. The "$CDBI_{50}$" is defined as the weight percent of ethylene polymer whose composition is within 50% of the median comonomer composition (50% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the ethylene interpolymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference.

Small-amplitude oscillatory shear (SAOS) analysis was carried out with a rotational rheometer, namely Rheometrics Dynamic Spectrometer (RDS-II) or Rheometrics SRS, ATS Stresstech, TA DHR-3, or Anton Paar MCR 501, on pre-compression molded samples under nitrogen atmosphere at 190° C., using 25 mm diameter cone-plate geometry (CP, a tip-angle of 5.701° and a truncation of 137 μm). The oscillatory shear experiments were done within the linear viscoelastic range of strain (10% strain or less) at frequencies from 0.05 to 100 rad/s. The values of storage modulus (G'), loss modulus (G"), complex modulus (G*) and complex viscosity (η*) were obtained as a function of frequency. The same rheological data can also be obtained by using a 25 mm diameter parallel-plate (PP) geometry at 190° C. under nitrogen atmosphere. The Zero shear viscosity is estimated using the Ellis model, i.e., $$|\eta^*| = \eta_0/(1+\tau/\tau_{1/2})^{\alpha-1},$$

where $\eta_0$ is the zero shear viscosity. $\tau_{1/2}$ is the value of the shear stress at which $|\eta^*|=\eta_0/2$ and $\alpha$ is an adjustable parameter.

The crossover frequency is the frequency at which storage modulus (G') and loss modulus (G") curves cross each other, while G'@G"=500 Pa is the storage modulus at which the loss modulus (G") is equal 500 Pa.

Dilution index values where determined according to the procedure described in the U.S. Pat. No. 9,512,282 B2.

In order to determine the exact moment of solid-to-liquid transition, the temperature- and frequency-dependence of viscoelastic functions (e.g. elastic modulus) was simultaneously over a temperature range from 40° C. to 140° C., or in some cases from 60° C. to 140° C. on pre-crystallized samples cooled from 140° C. to the desired temperature of 40° C. or 60° C. at a cooling rate of 0.5 K/min. In the present disclosure, the disclosed temperature-variable, small-amplitude frequency sweeps were carried out using an Anton Paar MCR501 rotational rheometer by a 25 mm parallel-plate (PP) geometry. A pre-compression molded disk of the ethylene interpolymer with a thickness of about 1.9-2 mm is loaded on the rheometer lower plate at a temperature close to 140° C. After reaching thermal equilibrium at 140° C., the upper plate is lowered squeezing the molten polymer at a rate of 1000 to 100 μm/s not exceeding a normal force of 40 N. The upper plate is lowered to a vertical position 30 μm above the testing gap-height and the excess molten sample is trimmed and the gap is lowered to the testing position of 1 mm. The temperature is then kept constant to reach thermal equilibrium at 140±0.1° C. The melt-state sample is then subjected to cooling to the desired temperature of 40° C. or 60° C. at a cooling rate of −0.5 K/min under multi-wave oscillations and then heated to 140° C. at a heating rate of +0.5 K/min under multi-wave oscillations. In these measurements, the strain-wave was prescribed as a superposition of multiple oscillation modes. The resulting stress-wave was then decomposed into sinusoidal components to compile stress amplitudes and phase-shifts corresponding to each strain-wave component. Linear viscoelastic functions were obtained by a multi-wave oscillation procedure enabling the measurement of viscoelastic functions (elastic modulus G', loss modulus G", loss-angle δ) simultaneously at several frequency levels, as a function of temperature, during both cooling and heating cycles. To achieve fast data recording, the fundamental frequency was set to 1 rad/s with its $2^{nd}$, $4^{th}$, $7^{th}$, $10^{th}$, $20^{th}$, $40^{th}$, $70^{th}$ harmonics. The multi-wave oscillation procedure consists applying a decomposition procedure available in the rheometer software (RHEOPLUS/32 V3.40) to obtain the individual stress-wave for each frequency component from the resulting stress-wave. The duration of each scan was 60 s and a thermal ramp of ±0.5 K/min was applied during the crystallization and melting cycles. The total strain was kept well within the linear viscoelastic limits ($\gamma_T$=0.047). The rheological response observed for ethylene interpolymer B1 is displayed in FIG. 1*a* using this test procedure during the melting cycle from 60 to 140° C. at a heating-rate of 0.5 K/min after a cooling cycle from 140° C. to 60° C. at a cooling-rate of −0.5 K/min under multi-wave oscillations. A gradual transition from a solid-like state (negative δ−|G*| slope) to a liquid-like state (positive δ−|G*| slope) is observable during the melting cycle. It is also noticeable that no superposition of viscoelastic functions is achievable in this representation unless a fully-molten state is reached. This is largely expected as phase-changing materials generally violate the so-called time-temperature superposition principle and demonstrate a thermorheologically complex behavior.

Figure 1B:
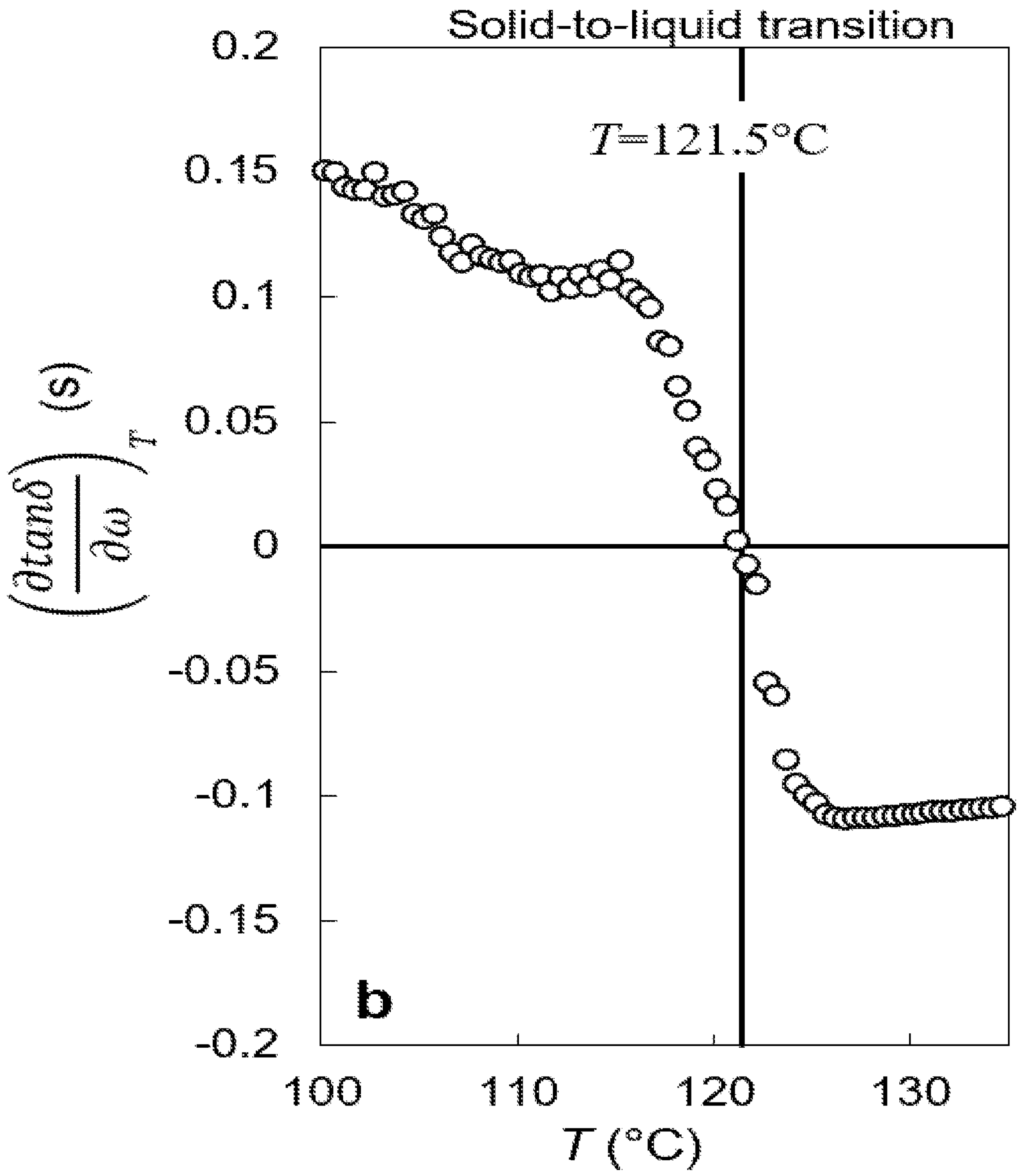
In FIG. 1*b*, the variation of the loss-angle tangent slope as a function of temperature is displayed. The instant of sign change was used to determine the solid-to-liquid transition (STL) point at T=121.5° C.

The instant of solid-to-liquid transition (STL) was determined as the instant the loss-angle tangent (tan δ) becomes independent of frequency, i.e., where $$\left(\frac{\partial \tan\delta}{\partial\omega}\right)_T$$

becomes zero. For this purpose, the loss-angle tangent was differentiated in the low-frequency domain (1 rad/s≤ω<10 rad/s). Typical results of such numerical differentiation method are depicted in FIG. 1*b* for ethylene interpolymer B1. As can be seen, the slope of tan δ is positive at low temperatures which is indicative of a solid-like behavior and at high temperatures a negative tan δ slope is observable suggesting a dominantly liquid-like behavior. The instant of sign change represents the solid-to-liquid transition point. The STL point was pinpointed using linear interpolation.

Figure 2A:
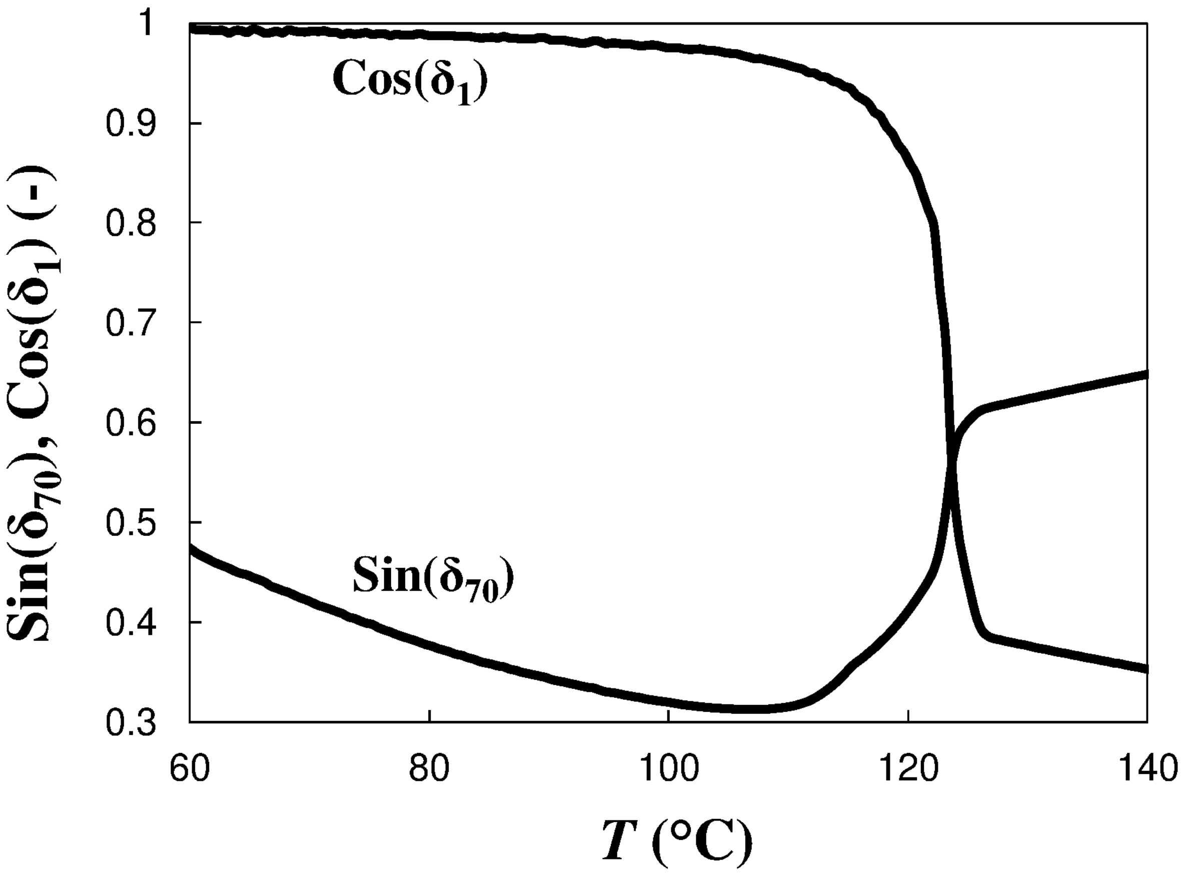
FIG. 2*a* shows the temperature variation of the sinus of the high-frequency phase-angle sin $\delta_{70}$ and the cosine of the low-frequency phase-angle cos $\delta_1$ for ethylene interpolymer B1.

A novel parameter was further defined in the present disclosure as a quantified performance indicator capturing the magnitude and broadness of high-frequency dissipative nature and low-frequency elasticity of a resin within the melting interval. An ideal heat sealant resin is defined in this disclosure as per a composition having an intermediate to low elasticity at low frequencies facilitating wetting and interdiffusion processes promoting self-adhesion combined with an intermediate to high dissipative component at high frequencies improving the seal-strength and postponing the seal failure. Toward this intended goal, as shown in FIG. 2*a*, the obtained dynamic moduli data obtained using the test method outlined in above can be converted into sinus of a high-frequency loss-angle sin $\delta_{70}$ ($\delta_{70}=[\tan^{-1}(G''/G')]_{\omega=70\ rad/s}$) as a measure of dissipation response under high-rate deformations (at ω=70 rad/s) and cosine of a low-frequency loss-angle cos $\delta_1$ ($\delta_1=[\tan^{-1}(G''/G')]_{\omega=1\ rad/s}$) as a measure of elasticity under slow-rate deformations (at ω=1 rad/s). The latter can be corresponded with bulk cohesiveness and the former represents self-adhesion and wettability. If we multiply the two parameters, we achieve a measure which generally decreases as temperature increases (see FIG. 2*b*). Interestingly, this measure reaches a maximum at the solid-to-liquid point and the breadth of this peak characterizes for how long the material stayed near a critical-gel like state around its solid-to-liquid transition temperature (STL). A critical gel from a rheological perspective is described as a state where relaxation behavior becomes self-similar over a wide range of the relaxation times. The universality of this transition behavior is extensively discussed in Winter, H. Henning. "The critical gel", Structure and Dynamics of Polymer and Colloidal Systems. Springer, Dordrecht, 2002. 439-470 and Gelfer et al. "Physical Gelation of Crystallizing Metallocene and Ziegler-Natta Ethylene-Hexene Copolymers", Polymer, 2003 (44) 2363-2371 which are incorporated herein by reference in its entirety. The main consequence of such self-similar relaxation behavior at STL is a power-law relaxation spectrum with a longest relaxation time diverging to infinity.

Figure 2B:
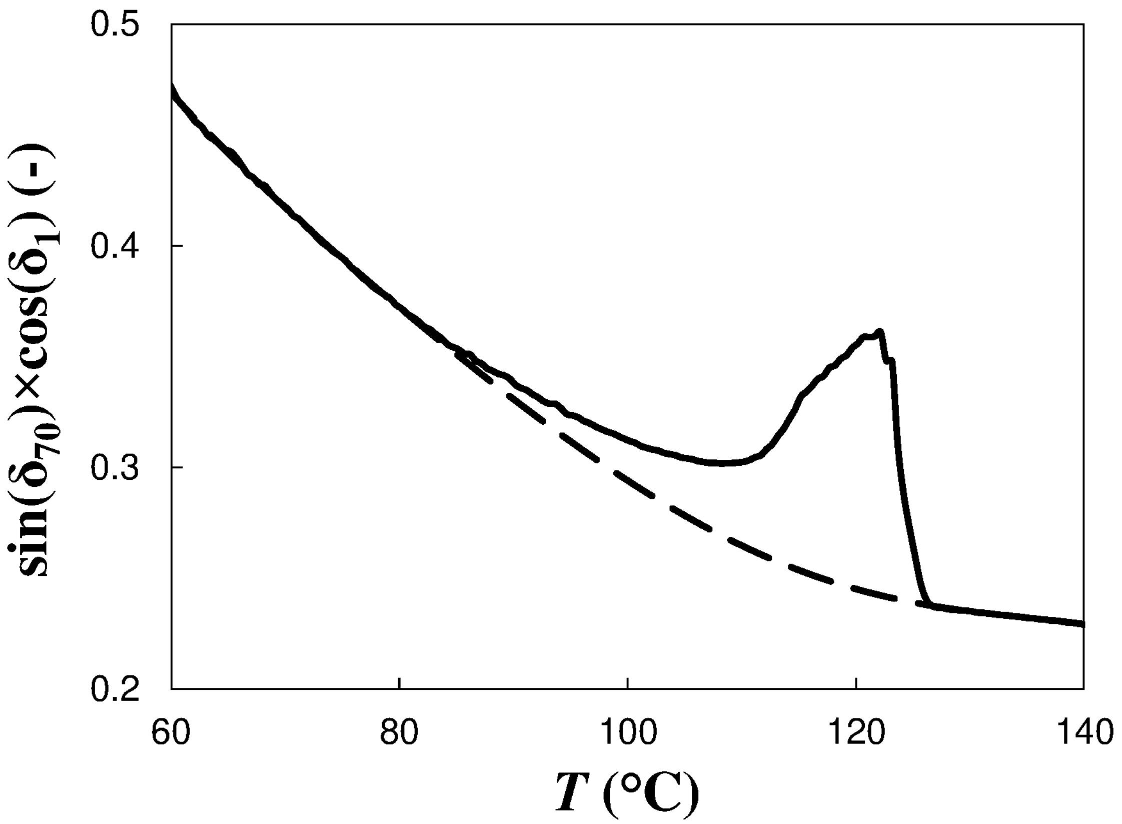
in FIG. 2*b*, temperature-dependence of the combined measure, sin $\delta_{70}$×cos $\delta_1$, is depicted. The dashed line is a 5th-order polynomial used for normalization with respect to the baseline behavior (overall descending trend).
Figure 2C:
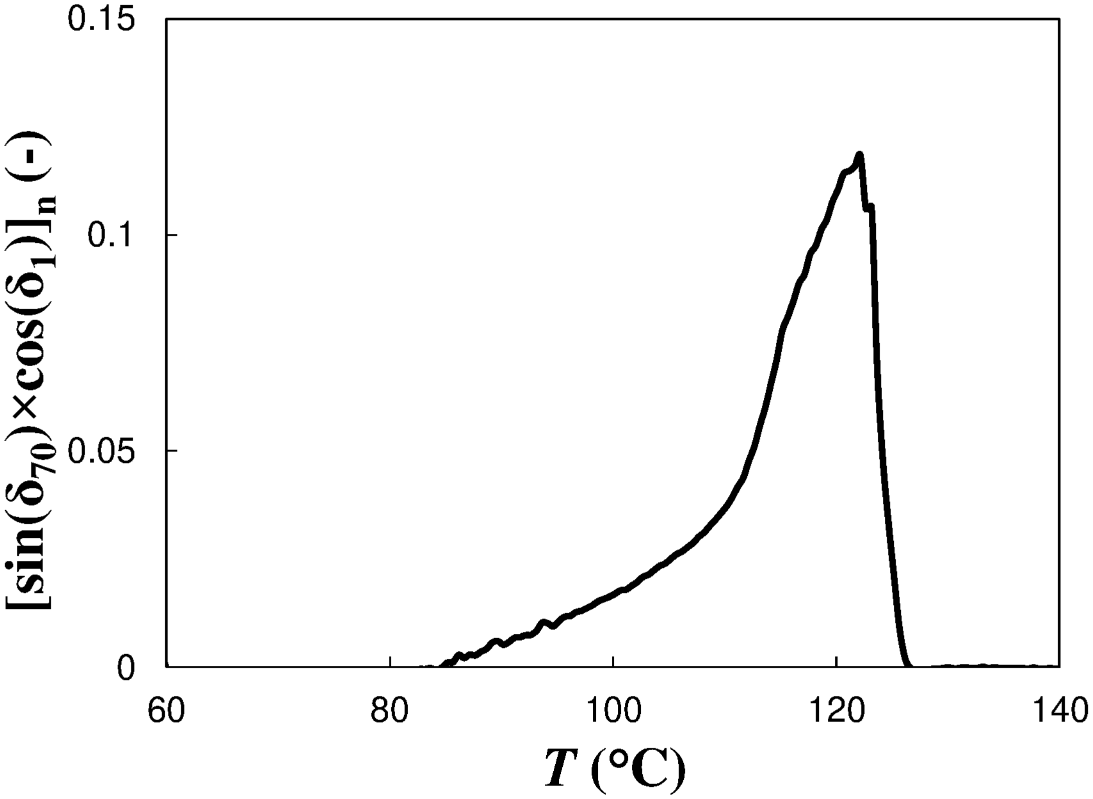
In FIG. 2*c*, the normalized combined measure is displayed as a function of temperature.

It can also be tried to normalize the peak-like behavior in FIG. 2*b* near the STL point relative to the baseline behavior (overall descending trend) using a $5^{th}$-order polynomial baseline correction method (see the dashed line in FIG. 2*b*). The weighted Rheological Adhesion Parameter was defined as follows:

$$\mathcal{R}h_{adh}=I_2^{-1}\int_{T_i}^{T_f}[\cos\delta_1\sin\delta_{70}]_n\,dT$$

where $I_2$ is the melt index obtained at 190° C. under a load of 2.16 kg, $[\cos\delta_1\ \sin\delta_{70}]_n$ is the normalized peak-like behavior near the STL point relative to the baseline behavior (overall descending trend shown in FIG. 2*b*) using a $5^{th}$-order polynomial baseline integrated numerically over a temperature range of $T_1$ to $T_f$. The two temperature limits of integration, $T_1$ and $T_f$, define the window where $[\cos\delta_1\ \sin\delta_{70}]_n$ is greater than zero as shown in FIG. 2*c*. Numerical integration was done in the present disclosure using a trapezoidal method applied to integration subintervals with a length of 0.5° C. from $T_i$ to $T_f$.

Figure 3A:
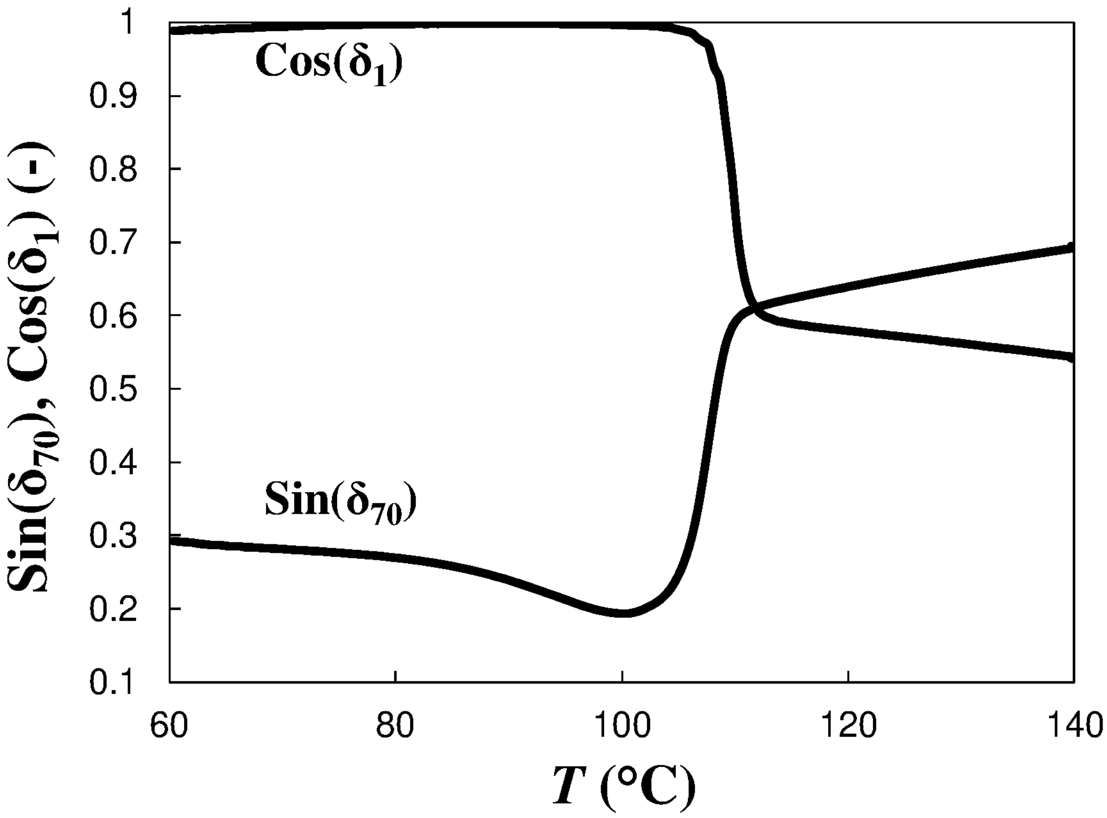
FIG. 3*a* shows the temperature variation of the sinus of the high-frequency phase-angle sin $\delta_{70}$ and the cosine of the low-frequency phase-angle cos $\delta_1$ for Comparative Example 2.
Figure 3B:
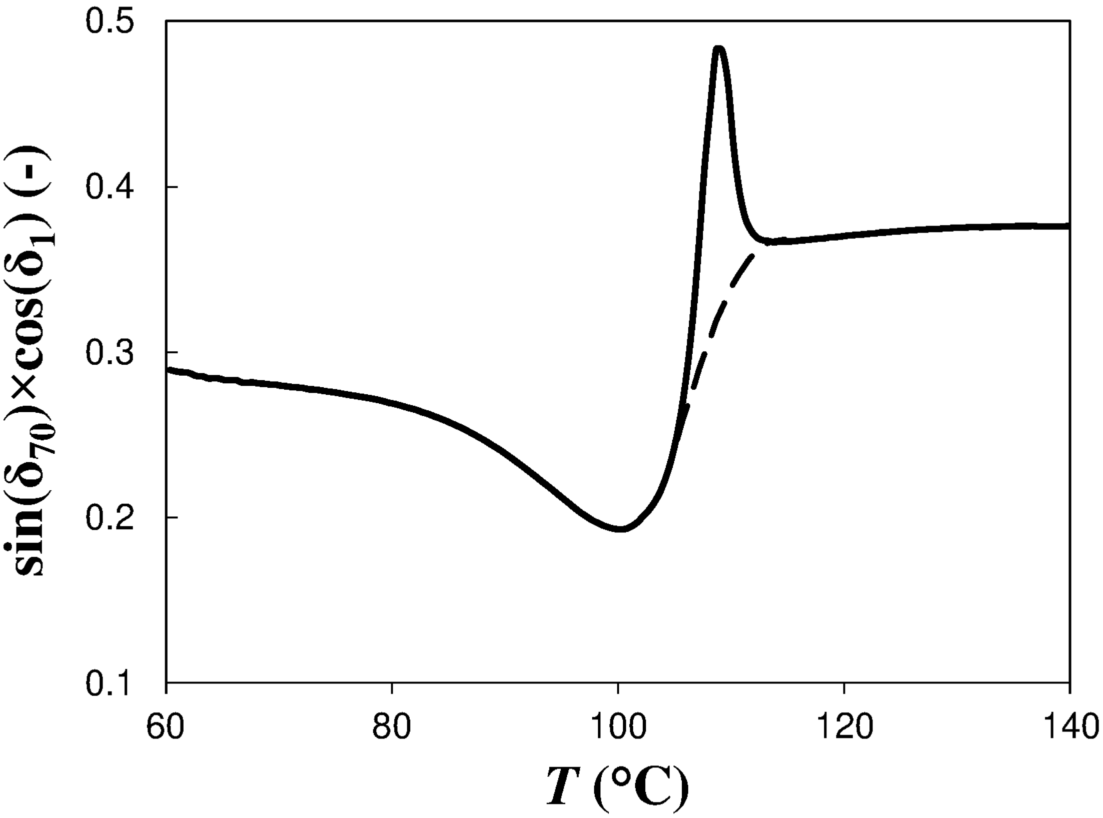
in FIG. 3*b*, temperature-dependence of the combined measure, sin $\delta_{70}$×cos $\delta_1$, is depicted. The dashed line is a 5th-order polynomial used for normalization with respect to the baseline behavior.
Figure 3C:
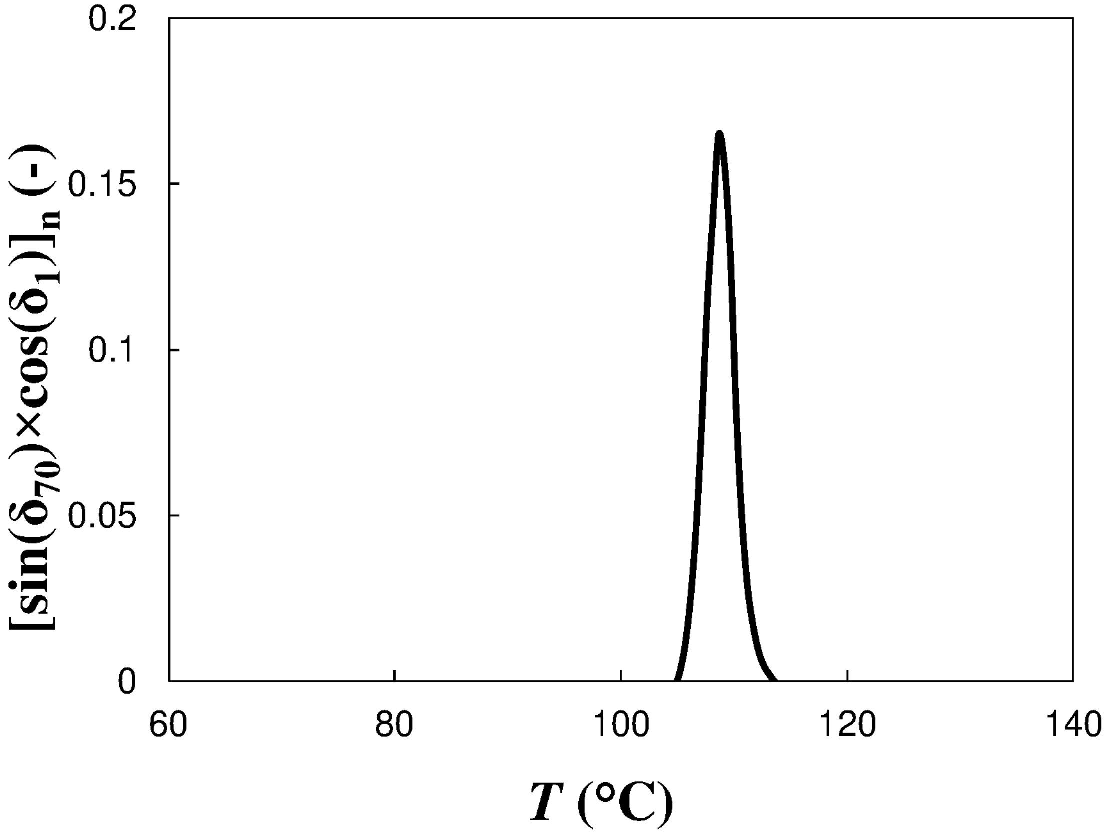
In FIG. 3*c*, the normalized combined measure is displayed as a function of temperature.
Figure 4A:
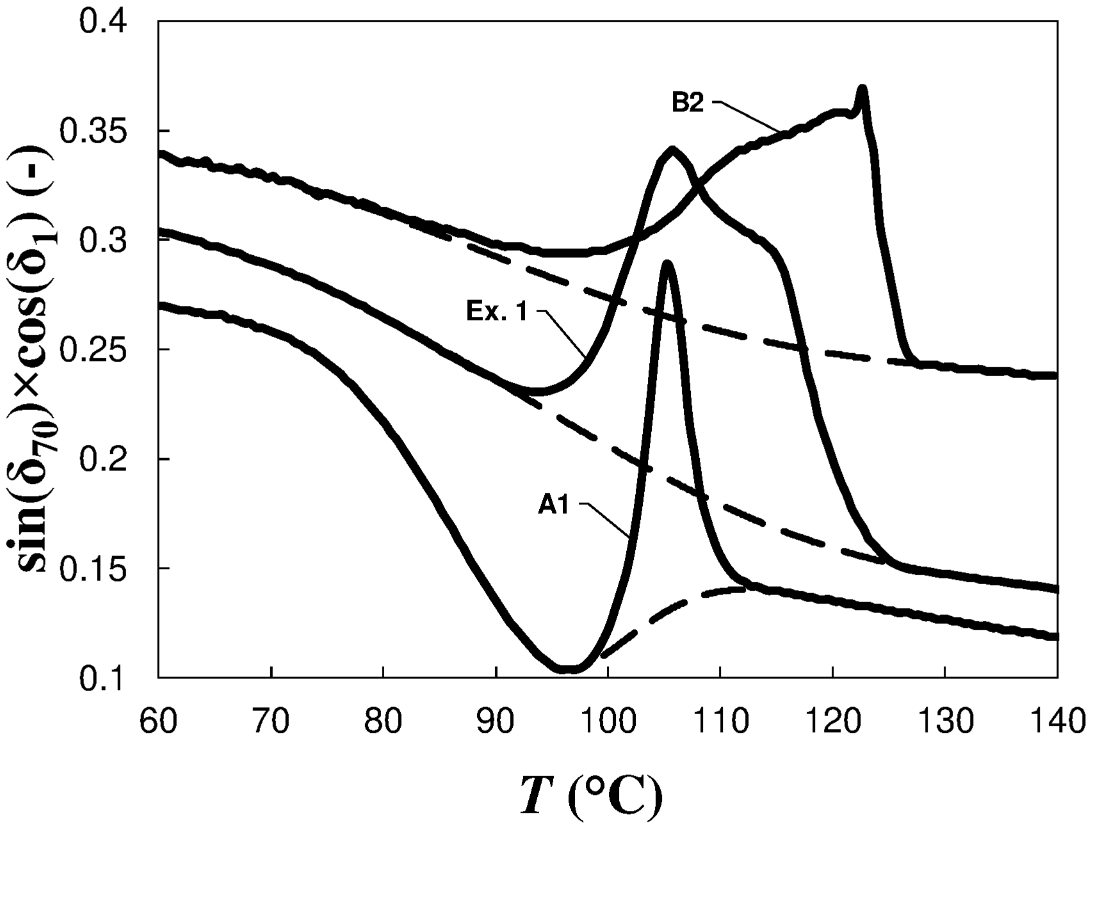
FIG. 4*a* shows the temperature-dependence of the combined measure, sin $\delta_{70}$×cos $\delta_1$, for ethylene interpolymer A1, B2 and Inventive Example 1. The dashed line is a 5th-order polynomial used for normalization with respect to the baseline behavior.
Figure 4B:
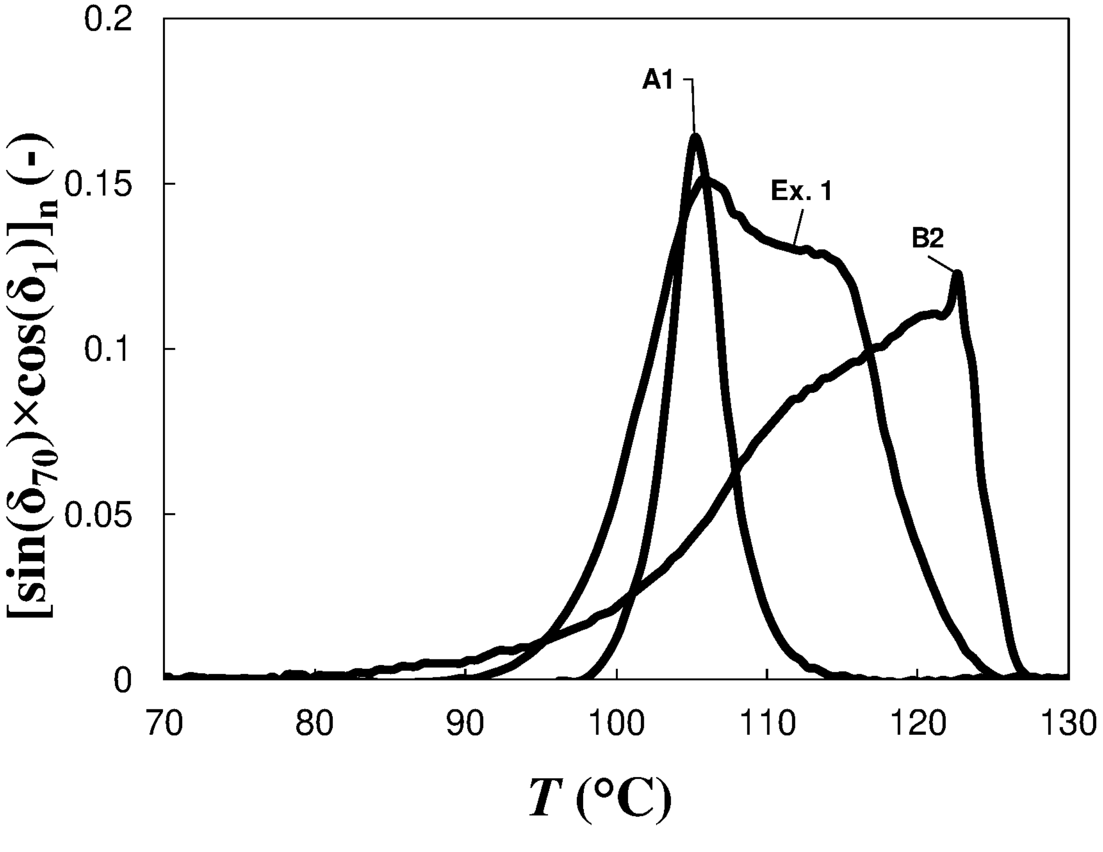
In FIG. 4*b*, the normalized combined measure for ethylene interpolymer A1, B2 and Inventive Example 1 is displayed as a function of temperature.

For the case of samples with high levels of LCB (such as Comparative Examples 1, 2 and 3) and/or high MW, narrow polydispersity resins (such as ethylene interpolymer A1), a high-temperature plateau can follow the peak region in the cos $\delta_1$ sin $\delta_{70}$ response. FIG. 3 shows the cos $\delta_1$ sin $\delta_{70}$ response observed for the Comparative Example 2 and the $5^{th}$-order polynomial baseline used for the purpose of normalization. To obtain the baseline function, several data points in the valley region in proximity of the minimum and in the high-temperature plateau region were used. FIG. 4 further shows the cos $\delta_1$ sin $\delta_{70}$ response monitored for the ethylene interpolymers A1 and B2 and the Inventive Example 1 (Ex. 1; a 80/20 blend of A1/B2) and the applied normalization process. Compared to ethylene interpolymer A1 and B2, one can observe a synergistic broadening of the region (i.e., note the flattened region) where the Inventive Example 1 stayed near a critical-gel like state around its solid-to-liquid transition temperature (STL). Such information is only available to a rheological technique focusing on temperature-dependence of mechanical response of polymeric materials and is inaccessible to conventional thermal analysis methods such as differential scanning calorimetry (DSC). One can further notice that the novel Rheological Adhesion Parameter introduced in the present disclosure is obtained using a bulk rheological measurement and can be generally used to compare self-adhesion properties of polymers (e.g., onset and breadth of self-adhesion) unlike film-based tests such as hot-tack or cold-seal tests where film thickness, forming stage operating conditions, etc. limit generality of results.

The tallest melting peak in ° C. was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The tallest DSC melting peak is reported from the $2^{nd}$ heating cycle.

Film dart impact strength was determined using ASTM D1709-09 Method A (May 1, 2009). In this disclosure the dart impact test employed a 1.5 inch (38 mm) diameter hemispherical headed dart.

The film "ASTM puncture" is the energy (J/mm) required to break the film was determined using ASTM D5748-95 (originally adopted in 1995, reapproved in 2012). The puncture test is performed on a mechanical tester, in which the puncture probe is attached to the load cell which is mounted on a moving crosshead. The film is clamped into a clamping mechanism which has a 4 inch (102 mm) diameter opening. The clamping mechanism is attached to a fixed plate. The cross-head speed is set at 10 in/min (255 mm/min). The maximum force and energy to puncture the film are recorded.

The "slow puncture" or "lubricated puncture" test was performed as follows: the energy (J/mm) to puncture a film sample was determined using a 0.75-inch (1.9-cm) diameter pear-shaped fluorocarbon coated probe travelling at 10-inch per minute (25.4-cm/minute). ASTM conditions were employed. Prior to testing the specimens, the probe head was manually lubricated with Muko Lubricating Jelly to reduce friction. Muko Lubricating Jelly is a water-soluble personal lubricant available from Cardinal Health Inc., 1000 Tesma Way, Vaughan, ON L4K 5R8 Canada. The probe was mounted in an Instron Model 5 SL Universal Testing Machine and a 1000-N load cell as used. Film samples (1.0 mil (25 μm) thick, 5.5 inch (14 cm) wide and 6 inch (15 cm) long) were mounted in the Instron and punctured. The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft·lb/$in^3$). Tensile properties were measured in the both the machine direction (MD) and the transverse direction (TD) of the blown films.

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress); and the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law, i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inches long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% secant modulus were calculated using the Instron software.

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film tear performance was determined by ASTM D1922-09 (May 1, 2009); an equivalent term for tear is "Elmendorf tear". Film tear was measured in both the machine direction (MD) and the transverse direction (TD) of the blown films.

Film optical properties were measured as follows: Haze, ASTM D1003-13 (Nov. 15, 2013), and Gloss ASTM D2457-13 (Apr. 1, 2013).

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together (the two film samples were cut from the same roll of 2.0 mil (51-μm) thick film), i.e. when the polyolefin macromolecules that comprise the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/$mm^2$; delay time, 0.5 second; film peel speed, 7.9 in/second (200 mm/second); testing temperature range, 131° F. to 293° F. (55° C. to 145° C.); temperature increments, 9° F. (5° C.); and five film samples were tested at each temperature increment to calculate average values at each temperature. In this way, a hot tack profile of pulling force vs sealing temperature is generated. The following data can be calculated from this hot tack profile: the "Tack Onset @ 1.0 N (° C.)", is the temperature at which a hot tack force of 1N was observed (an average of five film samples); the "Max Hot tack Strength (N)", is the maximum hot tack force observed (an average of five film samples) over the testing temperature range; the "Temperature-Max. Hot tack (° C.)", is the temperature at which the maximum hot tack force was observed. Finally, the area of the hot-tack (strength) window (the "area of hot tack window" or the "AHTW") is an estimate of the area under this hot tack profile from the hot-tack on-set temperature to the temperature immediately prior to the melting of the specimen. The latter temperature prior to the melting of the specimen is typically at 130° C., but not necessarily at 130° C. Piece-wise regressions (linear or polynomial) were performed for different segments of the hot tack profile to obtain the mathematical relationships between seal temperature and pulling force. The partial area of each temperature-force segment was then calculated. The total area (AHTW) is the summation of each partial area of each segment of the hot tack profile within the specified range (i.e., from the hot-tack on-set temperature to the temperature immediately prior to the melting of the specimen).

In this disclosure, the "Heat Seal Strength Test" (also known as "the cold seal test") was performed as follows. ASTM conditions were employed. Heat seal data was generated using a conventional Instron Tensile Tester. In this test, two film samples are sealed over a range of temperatures (the two film samples were cut from the same roll of 2.0 mil (51-μm) thick film). The following parameters were used in the Heat Seal Strength (or cold seal) Test: film specimen width, 1 inch (25.4 mm); film sealing time, 0.5 second; film sealing pressure, 40 psi (0.28 N/$mm^2$); temperature range, 212° F. to 302° F. (100° C. to 150° C.) and temperature increment, 9° F. (5° C.). After aging for at least 24 hours at ASTM conditions, seal strength was determined using the following tensile parameters: pull (crosshead) speed, 12 inch/min (2.54 cm/min); direction of pull, 90° to seal, and; 5 samples of film were tested at each temperature increment. The Seal Initiation Temperature, hereafter S.I.T., is defined as the temperature required to form a commercially viable seal; a commercially viable seal has a seal strength of 2.0 lb per inch of seal (8.8 N per 25.4 mm of seal).

Ethylene Interpolymer Product

Ethylene interpolymer products comprising a first and a second ethylene interpolymer were made by melt blending a first ethylene interpolymer A1 or A2 and with a second ethylene interpolymer B1 or B2.

Ethylene interpolymers A1 and A2 are 1-octene/ethylene copolymers made using a single site catalyst as described below in a solution polymerization process in a single CSTR reactor. Reactor pressure varied from 14 MPa to 18 MPa; the reactor was agitated to give conditions in which the reactor contents were well mixed. The process was operated continuously by feeding fresh process solvent, ethylene, 1-octene and hydrogen to the reactor. Methylpentane was used as the process solvent (a commercial blend of methylpentane isomers). The volume of the CSTR reactor was 3.2 gallons (12 L). A more general, multiple reactor/multiple catalyst solution phase polymerization reactor process has been described in the Canadian Patent Application No. 2,868,640 A1.

The following illustrates the continuous solution copolymerization of ethylene and 1-octene at medium pressure in a single reactor. The reactor pressure was about 16,000 kPa (about $2.3\times10^3$ psi). The process was continuous in all feed streams (i.e. solvents, which were methyl pentane and xylene; monomers and catalyst and cocatalyst components) and in the removal of product. Monomer (ethylene) and comonomer (1-octene) were purified prior to addition to the reactor using conventional feed preparation systems (such as contact with various absorption media to remove impurities such as water, oxygen and polar contaminants). The reactor feeds were pumped to the reactors at the ratios shown in Table 1. Average residence time for the reactor is calculated by dividing average flow rates by reactor volume. The residence time for all of the inventive experiments was less than 10 minutes and the reactor was well mixed. The catalyst deactivator used was octanoic acid (caprylic acid), commercially available from P&G Chemicals, Cincinnati, OH, U.S.A.

The following single site catalyst (SSC) components were used to prepare the ethylene interpolymer A1 or A2 in a single reactor: cyclopentadienyl tri(tertiary butyl)phosphinimine titanium dichloride [$Cp((t-Bu)_3PN)TiCl_2$]; methylaluminoxane (MMAO-07); trityl tetrakis(pentafluoro-phenyl) borate (trityl borate), and 2,6-di-tert-butyl-4-ethylphenol (BHEB). Methylaluminoxane (MMAO-07) and 2,6-di-tert-butyl-4-ethylphenol are premixed in-line and then combined with cyclopentadienyl tri(tertiary butyl)phosphinimine titanium dichloride [$Cp((t-Bu)_3PN)TiCl_2$] and trityl tetrakis (pentafluoro-phenyl)borate just before entering the polymerization reactor.

Ethylene interpolymer B1 and B2, on the other hand were Ziegler-Natta catalyzed linear low-density polyethylenes commercially available from NOVA Chemicals Corporation under commercial codes SCLAIR® FP120-A and FP112-A. Ethylene interpolymer B1 (SCLAIR FP120-A) has a density of 0.920 g/$cm^3$ and a melt index 12 of 1 dg/min. Ethylene interpolymer B2 (SCLAIR FP112-A) has a density of 0.912 g/$cm^3$ and a melt index 12 of 0.9 dg/min.

The properties of ethylene interpolymer A1, A2, B1 and B2 are summarized in Table 2.

The properties of ethylene interpolymer products which were obtained from melt blending ethylene interpolymer A1 or A2 with ethylene interpolymer B1 or B2 are provided in Table 3 as Examples 1 through 7 with varying content of each component. The materials were melt-blended using a Coperion ZSK 26 co-rotating twin screw extruder with an L/D of 32:1. The extruder was fitted with an underwater pelletizer and a Gala spin dryer. The materials were co-fed to the extruder using gravimetric feeders to achieve the desired ratios of ethylene interpolymer A1 or A2 to ethylene interpolymer B1 or B2. The blends were compounded using a screw speed of 200 rpm at an output rate of 15-20 kg/hour and at a melt temperature of 225-230° C.

Data for comparative compositions, Comparative Examples 1 through 6, is included in Table 4. Comparative Example 1 is ELITE® AT 6202, a resin commercially available from the Dow Chemical Company. ELITE AT 6202 has a density of about 0.908 g/$cm^3$ and a melt index 12 of about 0.85 dg/min. Comparative Example 2 is AFFINITY® PL1840G, a resin commercially available from the Dow Chemical Company. AFFINITY PL1840G has a density of 0.909 g/$cm^3$ and a melt index 12 of 1 dg/min. Comparative Examples 3 is Queo™ 1001, a resin commercially available from *Borealis*. Queo 1001 has a density 0.910 g/$cm^3$ and a melt index 12 of 1.1 dg/min. Comparative Example 4 is EXCEED® 1012HA, a resin commercially available from ExxonMobil. EXCEED 1012HA has a density of about 0.912 g/$cm^3$ and a melt index 12 of about 0.98 dg/min. Comparative Example 5 is ELITE® 5400, a resin commercially available from the Dow Chemical Company. ELITE 5400 has a density of about 0.916 g/$cm^3$, a melt index $I_2$ of about 1 dg/min. Comparative Example 6 is a commercial product called SURPASS® VPsK914 available from NOVA Chemicals Corporation. SURPASS VPsK914 has a density of about 0.914 g/$cm^3$ and a melt index 12 of about 0.86 dg/min.

Figure 5:
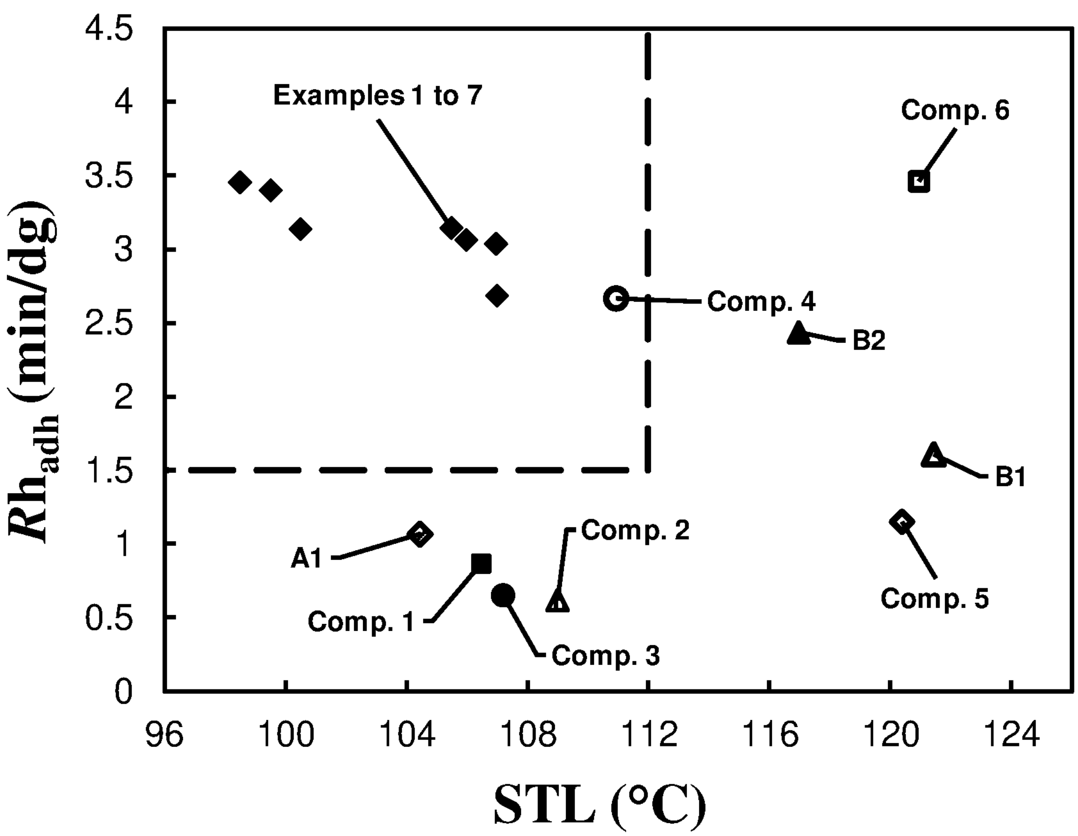
FIG. 5 shows the weighted Rheological Adhesion Parameter, $\mathcal{R}h_{adh}$, as a function of STL point. The dash line encloses the range characterizing Inventive Examples 1 through 7.

With reference to FIG. 5 and the data in Tables 2, 3 and 4, it can be recognized that the ethylene interpolymer products (namely Examples 1 through 7) have a significantly improved Rheological Adhesion parameter ($\mathcal{R}h_{adh}$ values greater than 1.5) as compared with the Comparatives and ethylene interpolymer components (A1, A2, B1 and B2) at solid-to-liquid transition temperatures below 112° C. The ethylene interpolymer products (Examples 1 through 7) further have a dilution index greater than 0, soluble fraction in a TREF experiment less than 7%, a $I_{21}/I_2$ ratio of less than 30, a G' at G"=500 Pa of no less than 12 Pa and a $$\frac{M_w}{M_n}$$

from 1.5 to 5. Without wishing to be limited by any theory, substantially increased [sin $\delta_{70}$ cos $\delta_1]_n$ in vicinity of the solid-to-liquid transition region can be explained by synergistic interactions between the low-STL crystallites formed by the homogeneously-branched component (ethylene interpolymer A1 or A2) with high-MW, branch-free molecules of the heterogeneously-branched component (ethylene interpolymer B1 or B2). This synergy was further intensified by careful selection of components SCB contents and molecular weights (i.e., the ratios of $$\frac{SCB^2}{SCB^1} \text{ and } \left.\frac{M_w^2}{M_w^1}\right)$$

to form ethylene interpolymer products with a low STL and significantly improved self-adhesion and energy dissipation under fast deformation rates within a semi-solid/semi-liquid state.

TABLE 1

| Reactor Operating Conditions | | |
|---|---|---|
| Ethylene Interpolymer | A1 | A2 |
| TSR (kg/hr) | 400 | 400 |
| Ethylene concentration (wt. %) | 8.3 | 8.3 |
| 1-Octene/ethylene in fresh feed (g/g) | 1.34 | 2.0 |
| Feed Temperature (° C.) | 30 | 30 |
| Mean Reactor Temperature (° C.) | 133.2 | 132.8 |
| Ethylene Conversion | 89.0 | 89.0 |
| Hydrogen Feed (ppm) | 0.98 | 0.02 |
| Catalyst[a] (ppm) | 0.24 | 0.32 |

TABLE 1-continued

| Reactor Operating Conditions | | |
|---|---|---|
| Ethylene Interpolymer | A1 | A2 |
| Al/Ti (mol/mol) | 100 | 100 |
| BHEB[b]/Al (mol/mol) | 0.3 | 0.3 |
| B/Ti (mol/mol) | 1.17 | 1.17 |

[a]cyclopentadienyl tri(tertiary butyl) phosphinimine titanium dichloride [Cp((t-Bu)3PN) TiCl2];
[b]2,6-di-tert-butyl-4-ethylphenol (BHEB)

TABLE 2

| Ethylene Interpolymers Properties | Ethylene Interpolymers | | | |
|---|---|---|---|---|
| | A1 | A2 | B1 | B2 |
| Density ($g/cm^3$) | 0.9055 | 0.8958 | 0.9188 | 0.9111 |
| Melt Index $I_2$ (g/10 min) | 0.78 | 0.66 | 1.02 | 0.85 |
| Melt Index $I_6$ (g/10 min) | 2.64 | 2.24 | 4.15 | 3.77 |
| Melt Index $I_{21}$ (g/10 min) | 11.9 | 10.3 | 28.1 | 27.3 |
| Melt Flow Ratio ($I_{21}/I_2$) | 15.3 | 15.6 | 28.8 | 31.8 |
| Stress Exponent | 1.11 | 1.11 | 1.32 | 1.34 |
| $M_n$ | 58702 | 60207 | 33410 | 31677 |
| $M_w$ | 109198 | 112044 | 114425 | 115853 |
| $M_z$ | 171555 | 191304 | 347639 | 349191 |
| $M_w/M_n$ | 1.86 | 1.86 | 3.42 | 3.66 |
| SCB per$10^3$ $CH_2$s | 18.6 | 25.4 | 13.5 | 19.6 |
| $CDBI_{50}$ | 92.4 | 93.9 | 57.7 | 55.3 |
| G'@G"500 Pa (Pa) | 11.8 | 10.8 | 43.7 | 48.2 |
| Zero-shear viscosity (kPa · s) | 10.0 | 11.6 | 11.2 | 13.4 |
| Solid-to-liquid transition (° C.) | 104.5 | 90 to 97[a] | 121.5 | 117.0 |
| Weighted rheological adhesion parameter (min/dg) | 1.0 | — | 1.6 | 2.4 |
| Dilution index (°) | 9.8 | 9.2 | −0.3 | −1.1 |
| Tallest Melting Peak (° C.) | 102.4 | 94.2 | 119.5 | 115.6 |

[a]Not tested experimentally. The solid-to-liquid transition temperature was estimated for ethylene interpolymer A2 by linear extrapolation of the measured STLs for A2/B1 and A2/B2 blends.

TABLE 3

Ethylene Interpolymer Products (Inventive Examples 1 Through 7) Architectural Rheological and Thermal Properties

| | A1/B2 (80/20) Ex. 1 | A1/B2 (60/40) Ex. 2 | A2/B2 (80/20) Ex.3 | A2/B2 (60/40) Ex. 4 | A2/B2 (40/60) Ex. 5 | A2/B1 (80/20) Ex. 6 | A2/B1 (60/40) Ex. 7 |
|---|---|---|---|---|---|---|---|
| Density ($g/cm^3$) | 0.908 | 0.908 | 0.901 | 0.903 | 0.905 | 0.904 | 0.908 |
| $I_2$ (g/10 min) | 0.83 | 0.84 | 0.71 | 0.73 | 0.79 | 0.72 | 0.80 |
| $I_6$ (g/10 min) | 2.94 | 3.04 | 2.49 | 2.69 | 2.96 | 2.53 | 2.87 |
| $I_{21}$ (g/10 min) | 14.7 | 15.8 | 12.4 | 14.4 | 17.2 | 12.5 | 18.1 |
| ($I_{21}/I_2$) | 17.7 | 18.9 | 17.6 | 19.7 | 21.9 | 17.3 | 19.0 |
| Stress Exponent | 1.15 | 1.17 | 1.15 | 1.19 | 1.21 | 1.14 | 1.17 |
| $CDBI_{50}$ | 85.1 | 77.7 | 87.1 | 80.1 | 72.7 | 82.2 | 73.8 |
| $M_n$ | 63327 | 47894 | 53964 | 47281 | 39243 | 50672 | 45218 |
| $M_w$ | 109276 | 102257 | 111807 | 114878 | 110035 | 111122 | 108609 |
| $M_z$ | 170328 | 171992 | 187378 | 253301 | 259328 | 190418 | 205309 |
| PDI ($M_w/M_n$) | 1.73 | 2.14 | 2.07 | 2.43 | 2.8 | 2.19 | 2.4 |
| SCB per $10^3$ $CH_2$s | 19 | 19 | 24 | 23 | 22 | 23 | 20 |
| Soluble fraction (%) | 2.0 | 3.2 | 1.6 | 2.6 | 3.4 | 1.0 | 1.2 |
| G'@G"500 Pa (Pa) | 17.8 | 24.5 | 17.0 | 23.6 | 30.3 | 19.0 | 24.1 |
| Zero-shear viscosity (kPa.s) | 10.2 | 10.5 | 11.6 | 11.6 | 11.8 | 11.1 | 11.0 |
| Solid-to-liquid transition (° C.) | 106.0 | 107.0 | 99.0 | 100.5 | 105.5 | 99.5 | 107.0 |
| Weighted rheological adhesion parameter (min/dg) | 3.1 | 3.0 | 3.5 | 3.1 | 3.1 | 3.4 | 2.7 |
| Dilution index (°) | 7.7 | 5.6 | 7.5 | 5.5 | 3.4 | 7.2 | 5.6 |
| Tallest Melting Peak (° C.) | 100.9 | 100.9 | 91.8 | 93.1 | 95.2 | 92.3 | 94.7 and 115.0 |

TABLE 4

| Comparative Examples 1 Through 6 Architectural and Rheological Properties | | | | | | |
|---|---|---|---|---|---|---|
| | Comp. 1 | Comp. 2 | Comp. 3 | Comp. 4 | Comp. 5 | Comp. 6 |
| Density (g/cm$^3$) | 0.908 | 0.909 | 0.909 | 0.912 | 0.916 | 0.914 |
| $I_2$ (g/10 min) | 0.83 | 0.87 | 1.11 | 0.98 | 1.00 | 0.86 |
| $I_6$ (g/10 min) | 3.77 | 4.45 | 5.78 | 3.42 | 4.46 | 3.34 |
| $I_{21}$ (g/10 min) | 25.8 | 30.2 | 41.2 | 16.4 | 30.9 | 19.5 |
| ($I_{21}/I_2$) | 29.9 | 34.6 | 36.2 | 16.7 | 30.6 | 22.7 |
| Stress Exponent | 1.34 | 1.48 | 1.48 | 1.13 | 1.35 | 1.24 |
| $CDBI_{50}$ | 86.5 | 84.3 | 86.7 | 71.6 | 64.7 | 62.0 |
| $M_n$ | 43351 | 42679 | 38112 | 48526 | 35528 | 43435 |
| $M_w$ | 94385 | 86254 | 82272 | 101890 | 98035 | 108418 |
| $M_z$ | 175746 | 155403 | 149535 | 167833 | 194619 | 231322 |
| PDI ($M_w/M_n$) | 2.18 | 2.02 | 2.16 | 2.1 | 2.76 | 2.5 |
| SCB per $10^3$ $CH_2$s | 20 | 18 | 19 | 20 | 16 | 17 |
| Soluble fraction (%) | 1.6 | 1.1 | 1.2 | 1.8 | 1.8 | 3.6 |
| G'@G"500 Pa (Pa) | 64.5 | 64.7 | 77.0 | 8.0 | 74.4 | 32.8 |
| Zero-shear viscosity (kPa.s) | 18.2 | 22.1 | 15.9 | 7.3 | 15.2 | 10.7 |
| Solid-to-liquid transition (° C.) | 106.5 | 109.0 | 107.2 | 111.0 | 120.4 | 121.0 |
| Weighted rheological adhesion parameter (min/dg) | 0.8 | 0.6 | 0.6 | 2.7 | 1.2 | 3.6 |
| Dilution index (°) | −4.6 | −9.0 | −9.8 | 10.2 | −4.6 | 3.4 |
| Tallest Melting Peak (° C.) | 105.2 | 99.6 | 103.5 | 101.9 | 118.0 and 122.2 | 119.7 and 122.9 |

The Examples 1 through 7 were blown into monolayer films using Gloucester Blown Film Line along with Comparatives. Monolayer blown films were produced on a Gloucester extruder, 2.5-inch (6.45 cm) barrel diameter, 24/1 LID (barrel Length/barrel Diameter) equipped with: a barrier screw; a low pressure 4 inch (10.16 cm) diameter die with a 35 mil (0.089 cm) die gap; and a Western Polymer Air ring. The extruder was equipped with the following screen pack: 20/40/60/80/20 mesh. Standard blown films, of about 1.0 mil (25.4 μm) thick and 2.0 mil (50.8 μm) thick, at 2.5:1 Blow Up Ratio (BUR), were produced at a constant output rate of 100 lb/hr (45.4 kg/hr) by adjusting extruder screw speed; and the frost line height was maintained at 16-18 inch (40.64-45.72 cm) by adjusting the cooling air. Monolayer films physical and mechanicals properties blown from the ethylene interpolymer products of the present disclosure is provided in Table 5A, along with data for films made from Comparative compositions in Table 5B. Comparative Example 1 is a film made from ELITE® AT 6202, a resin commercially available from the Dow Chemical Company. ELITE AT 6202 has a density of about 0.908 g/cm$^3$ and a melt index 12 of about 0.85 dg/min. Comparative Example 2 is a film made from AFFINITY® PL1840G, a resin commercially available from the Dow Chemical Company. AFFINITY PL1840G has a density of 0.909 g/cm$^3$ and a melt index 12 of 1 dg/min. Comparative Examples 3 is a film made from Queo™ 1001, a resin commercially available from *Borealis*. Queo 1001 has a density 0.910 g/cm$^3$ and a melt index 12 of 1.1 dg/min. Comparative Example 4 is a film made from EXCEED® 1012HA, a resin commercially available from ExxonMobil. EXCEED 1012HA has a density of about 0.912 g/cm$^3$ and a melt index 12 of about 0.98 dg/min. Comparative Example 5 is a film made from ELITE® 5400, a resin commercially available from the Dow Chemical Company. ELITE 5400 has a density of about 0.916 g/cm$^3$, a melt index 12 of about 1 dg/min. Comparative Example 6 is a film made from a commercial product called SURPASS® VPsK914 available from NOVA Chemicals Corporation. SURPASS VPsK914 has a density of about 0.914 g/cm$^3$ and a melt index 12 of about 0.86 dg/min.

In addition to the data in Table 5A and B, films having a larger thickness were made for the inventive composition as well as for Comparatives, in order to compare their heat-sealing characteristics (see Table 6). Noticeably, the inventive ethylene interpolymer products have much broader hot tack sealing window, better or equivalent hot tack seal onset (HTO) temperature and peak hot tack strength when compared with the Comparative Examples.

TABLE 5A

| Monolayer Films Physical and Mechanical Properties of the Inventive Examples 1 Through 7 | | | | | | | |
|---|---|---|---|---|---|---|---|
| | A1/B2 (80/20) Ex. 1 | A1/B2 (60/40) Ex. 2 | A2/B2 (80/20) Ex. 3 | A2/B2 (60/40) Ex. 4 | A2/B2 (40/60) Ex. 5 | A2/B1 (80/20) Ex. 6 | A2/B1 (60/40) Ex. 7 |
| Dart Impact (g/mil) | 768 | 803 | 1250 | 1166 | 908 | 1286 | 1386 |
| Slow Puncture (J/mm) | 156 | 139 | 154 | 126 | 139 | 173 | 139 |
| Tear-MD (g/mil) | 148 | 180 | 108 | 148 | 182 | 155 | 210 |
| Tear-TD (g/mil) | 291 | 380 | 209 | 284 | 376 | 259 | 347 |
| 1% Sec Modulus-MD (MPa) | 122.3 | 128.2 | 89.1 | 107.1 | 107.7 | 95.5 | 118.1 |
| 1% Sec Modulus-TD (MPa) | 118.7 | 130.3 | 92.7 | 111 | 115.5 | 97.3 | 122.4 |
| Tensile Strength at Break-MD (MPa) | 58.6 | 51.5 | 52.2 | 47.4 | 52.9 | 44.2 | 45.7 |
| Tensile Strength at Break-TD (MPa) | 41.8 | 36.2 | 31 | 29.4 | 47.5 | 36.1 | 60.3 |
| Elongation at Break-MD (%) | 501 | 473 | 451 | 468 | 492 | 468 | 488 |
| Elongation at Break-TD (%) | 614 | 609 | 575 | 582 | 677 | 608 | 722 |
| Yield Strength-MD (MPa) | 7.1 | 7.7 | 5.2 | 6.2 | 6.2 | 5.4 | 6.8 |

TABLE 5A-continued

Monolayer Films Physical and Mechanical Properties of the Inventive Examples 1 Through 7

| | A1/B2 (80/20) Ex. 1 | A1/B2 (60/40) Ex. 2 | A2/B2 (80/20) Ex. 3 | A2/B2 (60/40) Ex. 4 | A2/B2 (40/60) Ex. 5 | A2/B1 (80/20) Ex. 6 | A2/B1 (60/40) Ex. 7 |
|---|---|---|---|---|---|---|---|
| Yield Strength-TD (MPa) | 6.5 | 7.2 | 4.9 | 6 | 6.2 | 5.3 | 6.6 |
| Elongation at Yield-MD (%) | 11 | 11 | 11 | 11 | 11 | 11 | 11 |
| Elongation at Yield-TD (%) | 11 | 10 | 10 | 10 | 10 | 10 | 10 |
| Gloss at 45° | 86 | 83 | 89 | 86 | 85 | 88.5 | 84.7 |
| Haze (%) | 2.2 | 2.6 | 1.4 | 1.9 | 2.4 | 1 | 2 |

TABLE 5B

Monolayer Films Physical and Mechanical Properties of Comparative Examples 1 Through 6

| | Comp. 1 | Comp. 2 | Comp. 3 | Comp. 4 | Comp. 5 | Comp. 6 |
|---|---|---|---|---|---|---|
| Dart Impact (g/mil) | — | 685 | 708 | 1052 | 818 | 765 |
| Slow Puncture (J/mm) | 106 | 120 | 100 | 102a | 63 | 80 |
| Tear-MD (g/mil) | — | 164 | 149 | 171 | 247 | 246 |
| Tear-TD (g/mil) | — | 459 | 380 | 260 | 485 | 557 |
| 1% Sec Modulus-MD (MPa) | 141 | 126 | 102 | 133.7 | 165 | 174.9 |
| 1% Sec Modulus-TD (MPa) | 165 | 170 | 102 | 141.8 | 175 | 177.3 |
| Tensile Strength at Break-MD (MPa) | 133 | 116 | 98 | 124.8 | 151 | 162.6 |
| Tensile Strength at Break-TD (MPa) | 154 | 151 | 95 | 130.6 | 155 | 163.4 |
| Elongation at Break-MD (%) | — | 57.8 | 53.2 | 61.7 | 44 | 48.4 |
| Elongation at Break-TD (%) | — | 49.8 | 48.1 | 58 | 45.5 | 44.3 |
| Yield Strength-MD (MPa) | — | 553 | 543 | 599 | 486 | 508 |
| Yield Strength-TD (MPa) | — | 759 | 762 | 762 | 725 | 689 |
| Elongation at Yield-MD (%) | — | 7.2 | 7.4 | 8.8 | 9.1 | 9.7 |
| Elongation at Yield-TD (%) | — | 7.5 | 7.3 | 9.2 | 8.7 | 9.5 |
| Gloss at 45° | — | 11 | 15 | 10 | 13 | 11 |
| Haze (%) | — | 10 | 38 | 10 | 13 | 10 |

TABLE 6

Monolayer Films Physical and Mechanical Properties of the Inventive Example 1 Through 7

| | Hot Tack Onset (° C.) | Peak Hot Tack (cN) | Hot Tack Window at 2.5N (° C.) | Cold Seal Seal Initiation (° C.) |
|---|---|---|---|---|
| Example 1 | 87.0 | 4.5 | 30.2 | 91.1 |
| Example 2 | 84.6 | 4.1 | 43.9 | 89.7 |
| Example 3 | 82.4 | 4.3 | 38.9 | 83.8 |
| Example 4 | 76.8 | 4.4 | 40.2 | 84.0 |
| Example 5 | 75.0 | 4.2 | 45.4 | 84.2 |
| Example 6 | 80.9 | 5.0 | 36.2 | 84.8 |
| Example 7 | 80.4 | 4.6 | 40.7 | 86.0 |
| Comparative 1 | 100.1 | 4.6 | 39.7 | 106.6 |
| Comparative 2 | 94.9 | 3.9 | 14.8 | 92.1 |
| Comparative 3 | 96.9 | 3.9 | 11.6 | 93.0 |
| Comparative 4 | 83.8 | 5.0 | 37.9 | 89.2 |
| Comparative 5 | 93.4 | 4.9 | 37.1 | 101.2 |
| Comparative 6 | 87.1 | 4.9 | 32.3 | 94.3 |

The data provided in Table 5A and B together with the data in Table 6 demonstrate that the inventive ethylene interpolymer products described herein can be made into films having a good heat-sealing performance, good slow puncture and dart impact properties. The obtained films further have good optical properties and a good balance of film toughness and stiffness.

Non-limiting embodiments of the present disclosure include the following:

Embodiment A: An ethylene interpolymer product comprising from 40 to 80 weight % of a first ethylene interpolymer having a molecular weight distribution index of $$\frac{M_w}{M_n} < 2.3;$$

and from 20 to 60 weight % of a second ethylene interpolymer having a molecular weight distribution index of $$\frac{M_w}{M_n} > 2.3;$$

wherein the ethylene interpolymer product is characterized by a Dilution Index, $Y_d$, greater than 0 and a solid-to-liquid transition temperature not greater than 112° C.

Embodiment B: The ethylene interpolymer product of Embodiment A, wherein said ethylene interpolymer product is further characterized as having a weighted Rheological Adhesion Parameter, $\mathcal{R}h_{adh}$, greater than 1.5.

Embodiment C: The ethylene interpolymer product of claim Embodiment A wherein said ethylene interpolymer product is further characterized as having a weighted Rheological Adhesion Parameter, $\mathcal{R}h_{adh}$, greater than 2.5.

Embodiment D: The ethylene interpolymer product of Embodiment A, B or C wherein said ethylene interpolymer product is further characterized as having a Dilution Index, $Y_d$, greater than 3.

Embodiment E: The ethylene interpolymer product of Embodiment A, B, C or D wherein the weight average molecular weight of the second ethylene interpolymer $(M_w^2)$ and the weight average molecular weight of the first ethylene interpolymer $(M_w^1)$ satisfy $$1 \leq \frac{M_w^2}{M_w^1} \leq 2$$

inequality.

Embodiment F: The ethylene interpolymer product of Embodiment A, B, C, D or E wherein the number of short chain branches per thousand carbon atoms in the second ethylene interpolymer ($SCB^2$) and the number of short chain branches per thousand carbon atoms in the first ethylene interpolymer ($SCB^1$) satisfy $$0.7 < \frac{SCB^2}{SCB^1} < 1.1$$

inequality.

Embodiment G: The ethylene interpolymer product of Embodiment A, B, C, D, E or wherein said ethylene interpolymer product has a soluble fraction in a temperature rising elution fractionation (TREF) analysis of less than 7 weight %.

Embodiment H: The ethylene interpolymer product of Embodiment A, B, C, D, E or F wherein said ethylene interpolymer product has a soluble fraction in a temperature rising elution fractionation (TREF) analysis of less than 5 weight %.

Embodiment I: The ethylene interpolymer product of Embodiment A, B, C, D, E, F, G or H wherein said first ethylene interpolymer and said second ethylene interpolymer are synthesized using a solution polymerization process.

Embodiment J: The ethylene interpolymer product of Embodiment A, B, C, D, E, F, G, H or I wherein said first ethylene interpolymer is synthesized using a single-site catalyst formulation.

Embodiment K: The ethylene interpolymer product of Embodiment A, B, C, D, E, F, G, H or I wherein said first ethylene interpolymer is synthesized using a single-site catalyst formulation comprising a component (i) defined by the formula $$(L^A)_a M(PI)_b(Q)_n$$

wherein $L^A$ is selected from the group consisting of unsubstituted cyclopentadienyl, substituted cyclopentadienyl, unsubstituted indenyl, substituted indenyl, unsubstituted fluorenyl and substituted fluorenyl; M is a metal selected from the group consisting of titanium, hafnium and zirconium; PI is a phosphinimine ligand; Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M.

Embodiment L: The ethylene interpolymer product of Embodiment K wherein said single site catalyst formulation further comprises: an alumoxane co-catalyst; a boron ionic activator, and; optionally a hindered phenol.

Embodiment M: The ethylene interpolymer product of Embodiment L wherein said alumoxane co-catalyst is methylalumoxane (MAO) and said boron ionic activator is trityl tetrakis (pentafluoro-phenyl) borate.

Embodiment N: The ethylene interpolymer product of Embodiment A, B, C, D, E, F, G, H, I, J, K, L or M wherein said second ethylene interpolymer is synthesized using a heterogenous catalyst formulation.

Embodiment O: The ethylene interpolymer product of Embodiment A, B, C, D, E, F, G, H, I, J, K, L, M or N wherein said ethylene interpolymer product comprises from 0.1 to about 10 mole percent of one or more α-olefin.

Embodiment P: The ethylene interpolymer product of Embodiment O wherein said one or more α-olefin are $C_3$ to $C_{10}$ α-olefins.

Embodiment Q: The ethylene interpolymer product of Embodiment O wherein said one or more α-olefin is 1-hexene, 1-octene or a mixture of 1-hexene and 1-octene.

Embodiment R: The ethylene interpolymer product of Embodiment A, B, C, D, E, F, G, H, I, J, K, L, M, N, O, P or Q wherein said ethylene interpolymer product has a density from 0.880 to 0.930 g/cm$^3$, wherein density is measured according to ASTM D792-13.

Embodiment S: The ethylene interpolymer product of Embodiment R wherein said ethylene interpolymer product has a density from 0.885 to 0.925 g/cm$^3$, wherein density is measured according to ASTM D792-13.

Embodiment T: The ethylene interpolymer product of Embodiment A, B, C, D, E, F, G, H, I, J, K, L, M, N, O, P, Q, R or S wherein said first ethylene interpolymer has a density $d_1$ from 0.855 to 0.945 g/cm$^3$ and wherein said second ethylene interpolymer has a density $d_2$ from 0.855 to 0.945 g/cm$^3$, wherein said $d_1$ and $d_2$ satisfy $0 \leq d_2 - d_1 \leq 0.035$ g/cm$^3$.

Embodiment U: The ethylene interpolymer product of Embodiment A, B, C, D, E, F, G, H, I, J, K, L, M, N, O, P, Q, R, S or T wherein said first ethylene interpolymer has a density $d_1$ from 0.855 to 0.945 g/cm$^3$ and wherein said second ethylene interpolymer has a density $d_2$ from 0.855 to 0.945 g/cm$^3$, wherein said $d_1$ and $d_2$ satisfy $0 \leq d_2 - d_1 \leq 0.030$ g/cm$^3$.

Embodiment V: The ethylene interpolymer product of Embodiment A, B, C, D, E, F, G, H, I, J, K, L, M, N, O, P, Q, R, S, T or U wherein said first ethylene interpolymer has a density $d_1$ from 0.855 to 0.945 g/cm$^3$ and wherein said second ethylene interpolymer has a density $d_2$ from 0.855 to 0.945 g/cm$^3$, wherein said $d_1$ and $d_2$ satisfy $0 \leq d_2 - d_1 \leq 0.030$ g/cm$^3$.

Embodiment W: The ethylene interpolymer product of Embodiment A, B, C, D, E, F, G, H, I, J, K, L, M, N, O, P, Q, R, S, T, U or V wherein said ethylene interpolymer product has a melt index 12 from 0.1 to 3.0 dg/min wherein melt index is measured according to ASTM D1238 at 190° C. under a weight of 2.16 kg.

Embodiment X: The ethylene interpolymer product of Embodiment W wherein said ethylene interpolymer product has a melt index 12 from 0.1 to 2.0 dg/min wherein melt index is measured according to ASTM D1238 at 190° C. under a weight of 2.16 kg.

Embodiment Y: The ethylene interpolymer product of Embodiment W wherein said ethylene interpolymer product has a melt index 12 from 0.1 to 1.5 dg/min wherein melt index is measured according to ASTM D1238 at 190° C. under a weight of 2.16 kg.

Embodiment Z: The ethylene interpolymer product of Embodiment A, B, C, D, E, F, G, H, I, J, K, L, M, N, O, P, Q, R, S, T, U, V, W, X or Y wherein said ethylene interpolymer product has a weight-average molecular weight from 50000 to 250000 g/mol.

Embodiment AA: The ethylene interpolymer product of Embodiment A, B, C, D, E, F, G, H, I, J, K, L, M, N, O, P, Q, R, S, T, U, V, W, X, Y or Z wherein said first ethylene interpolymer has a weight average molecular weight from 50000 to 250000 g/mol; and wherein said second ethylene interpolymer has a weight average molecular weight from 50,000 to 250,000 g/mol.

Embodiment BB: The ethylene interpolymer product of Embodiment A, B, C, D, E, F, G, H, I, J, K, L, M, N, O, P, Q, R, S, T, U, V, W, X, Y, Z or AA wherein said ethylene interpolymer product has a molecular weight distribution index from $$\left(\frac{M_w}{M_n}\right)$$

1.5 to 5.0.

Embodiment CC: The ethylene interpolymer product of Embodiment A, B, C, D, E, F, G, H, I, J, K, L, M, N, O, P, Q, R, S, T, U, V, W, X, Y, Z, AA or BB wherein said ethylene interpolymer product has a storage modulus at a loss modulus of 500 Pa of no less than 12 Pa.

Embodiment DD: The ethylene interpolymer product of Embodiment A, B, C, D, E, F, G, H, I, J, K, L, M, N, O, P, Q, R, S, T, U, V, W, X, Y, Z, AA, BB or CC wherein said ethylene interpolymer product has a melt flow ratio (121/12) of less than 30.

Embodiment EE: A film layer having a thickness of from 0.5 to 10 mil, comprising the ethylene interpolymer product of Embodiment A, B, C, D, E, F, G, H, I, J, K, L, M, N, O, P, Q, R, S, T, U, V, W, X, Y, Z, AA, BB, CC or DD.

Embodiment FF: The film layer of Embodiment EE wherein the film layer is further characterized as having a haze value less than 6% and a Gloss at 45° value greater than 70.

Embodiment GG: The film layer of Embodiment EE or FF wherein the film layer is further characterized as having a hot tack seal onset temperature less than 90° C. and a hot tack window at 2.5N no less than 30° C. measured on a 2 mil (50 μm) blown film.

Embodiment HH: The film layer of Embodiment EE, FF or GG wherein the film layer is further characterized as having one or more of a slow puncture value no less than 110 J/mm on a 1 mil (25 μm) blown film according to ASTM D5748 and a dart impact value no less than 700 g measured on a 1 mil (25 μm) blown film according to ASTM D 1709/A.

INDUSTRIAL APPLICABILITY

The ethylene interpolymer products disclosed herein have industrial applicability in a wide range of packaging applications; non-limiting examples include flexible packaging films with a good heat-sealing performance, good slow puncture and dart impact properties, good optical properties and a good balance of film toughness and stiffness.

The invention claimed is:

1. An ethylene interpolymer product comprising:

(i) from 40 to 80 weight % of a first ethylene interpolymer having a molecular weight distribution index of $$\frac{M_w}{M_n} < 2.3;$$

and (ii) from 20 to 60 weight % of a second ethylene interpolymer having a molecular weight distribution index of $$\frac{M_w}{M_n} > 2.3,$$

wherein said ethylene interpolymer product is characterized by:

(a) a Dilution Index, $Y_d$, greater than 0; and (b) a solid-to-liquid transition temperature not greater than 112° C.

2. The ethylene interpolymer product of claim 1, wherein said ethylene interpolymer product is further characterized as having a weighted Rheological Adhesion Parameter, $\mathcal{R}h_{adh}$, greater than 1.5.

3. The ethylene interpolymer product of claim 1, wherein said ethylene interpolymer product is further characterized as having a weighted Rheological Adhesion Parameter, $\mathcal{R}h_{adh}$, greater than 2.5.

4. The ethylene interpolymer product of claim 1, wherein said ethylene interpolymer product is further characterized as having a Dilution Index, $Y_d$, greater than 3.

5. The ethylene interpolymer product of claim 1, wherein the weight average molecular weight of the second ethylene interpolymer $$(M_w^2)$$

and the weight average molecular weight of the first ethylene interpolymer $$(M_w^1)$$

satisfy $$1 \le \frac{M_w^2}{M_w^1} \le 2$$

inequality.

6. The ethylene interpolymer product of claim 5, wherein the number of short chain branches per thousand carbon atoms in the second ethylene interpolymer ($SCB^2$) and the number of short chain branches per thousand carbon atoms in the first ethylene interpolymer ($SCB^1$) satisfy $$0.7 < \frac{SCB^2}{SCB^1} < 1.1$$

inequality.

7. The ethylene interpolymer product of claim 1, wherein said ethylene interpolymer product has a soluble fraction in a temperature rising elution fractionation (TREF) analysis of less than 7 weight %.

8. The ethylene interpolymer product of claim 1, wherein said ethylene interpolymer product has a soluble fraction in a temperature rising elution fractionation (TREF) analysis of less than 5 weight %.

9. The ethylene interpolymer product of claim 1, wherein said first ethylene interpolymer and said second ethylene interpolymer are synthesized using a solution polymerization process.

10. The ethylene interpolymer product of claim 1, wherein said first ethylene interpolymer is synthesized using a single-site catalyst formulation.

11. The ethylene interpolymer product of claim 10, wherein said first ethylene interpolymer is synthesized using a single-site catalyst formulation comprising a component (i) defined by the formula:

$$(L^A)_aM(PI)_b(Q)_n$$

wherein $L^A$ is selected from the group consisting of unsubstituted cyclopentadienyl, substituted cyclopentadienyl, unsubstituted indenyl, substituted indenyl, unsubstituted fluorenyl and substituted fluorenyl; M is a metal selected from the group consisting of titanium, hafnium and zirconium; PI is a phosphinimine ligand;

Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M.

12. The ethylene interpolymer product of claim 11, wherein said single site catalyst formulation further comprises: an alumoxane co-catalyst; a boron ionic activator; and optionally a hindered phenol.

13. The ethylene interpolymer product of claim 12, wherein said alumoxane co-catalyst is methylalumoxane (MAO) and said boron ionic activator is trityl tetrakis (pentafluoro-phenyl) borate.

14. The ethylene interpolymer product of claim 1, wherein said second ethylene interpolymer is synthesized using a heterogenous catalyst formulation.

15. The ethylene interpolymer product of claim 1, wherein said ethylene interpolymer product comprises from 0.1 to about 10 mole percent of one or more α-olefin.

16. The ethylene interpolymer product of claim 15, wherein said one or more α-olefin are $C_3$ to $C_{10}$ α-olefins.

17. The ethylene interpolymer product of claim 15, wherein said one or more α-olefin is 1-hexene, 1-octene or a mixture of 1-hexene and 1-octene.

18. The ethylene interpolymer product of claim 1, wherein said ethylene interpolymer product has a density from 0.880 to 0.930 g/cm$^3$, wherein density is measured according to ASTM D792-13.

19. The ethylene interpolymer product of claim 18, wherein said ethylene interpolymer product has a density from 0.885 to 0.925 g/cm$^3$, wherein density is measured according to ASTM D792-13.

20. The ethylene interpolymer product of claim 18, wherein said first ethylene interpolymer has a density $d_1$ from 0.855 to 0.945 g/cm$^3$ and wherein said second ethylene interpolymer has a density $d_2$ from 0.855 to 0.945 g/cm$^3$, wherein said $d_1$ and $d_2$ satisfy $0 \le d_2 - d_1 \le 0.035$ g/cm$^3$.

21. The ethylene interpolymer product of claim 18, wherein said first ethylene interpolymer has a density $d_1$ from 0.855 to 0.945 g/cm$^3$ and wherein said second ethylene interpolymer has a density $d_2$ from 0.855 to 0.945 g/cm$^3$, wherein said $d_1$ and $d_2$ satisfy $0 \le d_2 - d_1 \le 0.030$ g/cm$^3$.

22. The ethylene interpolymer product of claim 1, wherein said ethylene interpolymer product has a melt index 12 from 0.1 to 3.0 dg/min wherein melt index is measured according to ASTM D1238 at 190° C. under a weight of 2.16 kg.

23. The ethylene interpolymer product of claim 1, wherein said ethylene interpolymer product has a melt index 12 from 0.1 to 2.0 dg/min wherein melt index is measured according to ASTM D1238 at 190° C. under a weight of 2.16 kg.

24. The ethylene interpolymer product of claim 1, wherein said ethylene interpolymer product has a melt index 12 from 0.1 to 1.5 dg/min wherein melt index is measured according to ASTM D1238 at 190° C. under a weight of 2.16 kg.

25. The ethylene interpolymer product of claim 1, wherein said ethylene interpolymer product has a weight-average molecular weight from 50,000 to 250,000 g/mol.

26. The ethylene interpolymer product of claim 5 wherein said first ethylene interpolymer has a weight average molecular weight from 50,000 to 250,000 g/mol; and wherein said second ethylene interpolymer has a weight average molecular weight from 50,000 to 250,000 g/mol.

27. The ethylene interpolymer product of claim 1, wherein said ethylene interpolymer product has a molecular weight distribution index from $$\left(\frac{M_w}{M_n}\right)$$

28. The ethylene interpolymer product of claim 1, wherein said ethylene interpolymer product has a tallest DSC melting peak at below 103° C.

29. The ethylene interpolymer product of claim 1, wherein said ethylene interpolymer product has a storage modulus at a loss modulus of 500 Pa of no less than 12 Pa.

30. The ethylene interpolymer product of claim 1, wherein said ethylene interpolymer product has a melt flow ratio ($I_{21}/I_2$) of less than 30.

31. A film layer having a thickness of from 0.5 to 10 mil, comprising the ethylene interpolymer product of claim 1.

32. The film layer of claim 31, wherein said film layer is further characterized as having:

(a) a haze value less than 6%; and (b) a Gloss at 45° value greater than 70.

33. The film layer of claim 31, wherein said film layer is further characterized as having:

(a) a hot tack seal onset temperature less than 90° C.; and (b) a hot tack window at 2.5N measured on a 2 mil (50 μm) blown film no less than 30° C.

34. The film layer of claim 31, wherein said film layer is further characterized as having one or more of:

(a) a slow puncture value no less than 110 J/mm on a 1 mil (25 μm) blown film according to ASTM D5748; and (b) a dart impact value no less than 700 g measured on a 1 mil (25 μm) blown film according to ASTM D 1709/A.

* * * * *